US012677162B2

(12) United States Patent
Li et al.

(10) Patent No.: US 12,677,162 B2
(45) Date of Patent: Jul. 7, 2026

(54) PROCESSING APPARATUS, TERMINAL AND NETWORK DEVICE

(71) Applicant: DATANG MOBILE COMMUNICATIONS EQUIPMENT CO., LTD., Beijing (CN)

(72) Inventors: Hui Li, Beijing (CN); Qiubin Gao, Beijing (CN); Runhua Chen, Beijing (CN); Yajuan Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 343 days.

(21) Appl. No.: 18/560,093

(22) PCT Filed: May 6, 2022

(86) PCT No.: PCT/CN2022/091145
§ 371 (c)(1),
(2) Date: Nov. 9, 2023

(87) PCT Pub. No.: WO2022/237637
PCT Pub. Date: Nov. 17, 2022

(65) Prior Publication Data
US 2024/0244451 A1 Jul. 18, 2024

(30) Foreign Application Priority Data
May 11, 2021 (CN) .......................... 202110512039.1

(51) Int. Cl.
H04W 16/28 (2009.01)
H04L 5/00 (2006.01)
(Continued)

(52) U.S. Cl.
CPC ........... *H04W 16/28* (2013.01); *H04L 5/0051* (2013.01); *H04W 72/232* (2023.01); *H04W 76/20* (2018.02)

(58) Field of Classification Search
None
See application file for complete search history.

(56) References Cited

U.S. PATENT DOCUMENTS

| 2021/0168030 A1 | 6/2021 | Li | |
| 2022/0239423 A1* | 7/2022 | Zhu | .......... H04L 5/0023 |
(Continued)

FOREIGN PATENT DOCUMENTS

| CN | 113366772 A | 9/2021 |
| WO | 2020019351 A1 | 1/2020 |
| WO | 2021008682 A1 | 1/2021 |

OTHER PUBLICATIONS

"Further details on Multi-beam and Multi-TRP operation," 3GPP TSG RAN WG1 Meeting #104-e, R1-2100292, e-Meeting, Jan. 25-Feb. 5, 2020, Source: ZTE, Agenda Item: 8.1.5.
(Continued)

*Primary Examiner* — Clemence S Han
(74) *Attorney, Agent, or Firm* — Ladas & Parry, LLP

(57) ABSTRACT

An information processing method, an information processing apparatus, a terminal and a network device are provided. The information processing method includes: receiving a beam indication signaling sent by a network device; sending and/or receiving a channel and/or a reference signal corresponding to a target beam according to the beam indication signaling and beam configuration information, where the beam indication signaling includes: at least one activated transmission configuration indicator TCI state group; and the beam configuration information includes: at least one associated beam parameter corresponding to at least one channel and/or at least one reference signal.

20 Claims, 2 Drawing Sheets

Receiving a beam indication signaling sent by a network device /21

Sending and/or receiving a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal /22

(51) Int. Cl.
    *H04W 72/232*        (2023.01)
    *H04W 76/20*         (2018.01)

(56)                References Cited

U.S. PATENT DOCUMENTS

| | | | |
|---|---|---|---|
| 2023/0216565 A1* | 7/2023 | Kwak | H04B 7/088 |
| | | | 375/267 |
| 2023/0345570 A1* | 10/2023 | Fan | H04B 7/06964 |
| 2024/0040584 A1* | 2/2024 | Yuan | H04W 72/232 |

OTHER PUBLICATIONS

"Fraunhofer IIS, Fraunhofer HHI," 3GPP TSG RAN WG1 Meeting #104-e, R1-2100534, E-meeting, Jan. 25-Feb. 5, 2021, Agenda Item: 8.1.1—Enhancements on Multi-beam Operation, Source: Fraunhofer IIS, Fraunhofer HHI.

International Search Report for International Patent Application No. PCT/CN2022/091145 issued by the International Patent Office on Aug. 2, 2022, and its English translation provided by WIPO.

Written Opinion for International Patent Application No. PCT/CN2022/091145 issued by the International Patent Office on Aug. 2, 2022, and its English translation provided by WIPO.

International Preliminary Report on Patentability for International Patent Application No. PCT/CN2022/091145 issued by the International Patent Office on Nov. 14, 2023 and its English translation provided by WIPO.

* cited by examiner

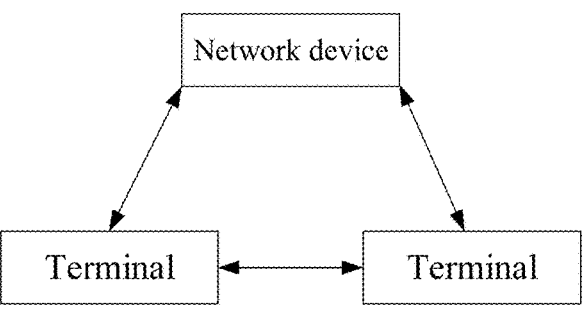

FIG.1

Receiving a beam indication signaling sent by a network device    21

Sending and/or receiving a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal    22

FIG.2

Determining a beam indication signaling and sending the beam indication signaling to a terminal    31

Sending and/or receiving a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal    32

FIG.3

PROCESSING APPARATUS, TERMINAL AND NETWORK DEVICE

CROSS REFERENCE OF TO RELATED APPLICATIONS

This application is the U.S. national phase of PCT Application No. PCT/CN2022/091145 filed on May 6, 2022, which claims a priority to Chinese patent application No. 202110512039.1 filed in China on May 11, 2021, the disclosures of which are incorporated herein by reference in their entireties.

TECHNICAL FIELD

The present disclosure relates to the field of communications technology, and in particular, to an information processing method, an information processing apparatus, a terminal and a network device.

BACKGROUND

In the related art, different channels are configured with different beam indication signalings, and beam indication is performed on each channel independently, so that transmission on different channels may be performed respectively by using different beams. An important scenario in practical applications is that the same beam direction is used for multiple channels. For example, the same beam direction is used for transmission between part of Physical Downlink Control Channels (PDCCH) used for resource scheduling and Physical Downlink Shared Channels (PDSCH) used to transmit user data; the same beam direction may also be used for part of Physical Uplink Control Channels (PUCCH) and Physical Uplink Shared Channels (PUSCH). When beam reciprocity exists, the same beam direction is also used for uplink and downlink channels. At this time, the current independent beam indication method increases system complexity and signaling indication overhead.

It can be seen from the above that the information processing solution related to beam indication in the related art has the problem of increasing system complexity and signaling indication overhead.

SUMMARY

The objective of the present disclosure is to provide an information processing method, an information processing apparatus, a terminal and a network device, so as to solve a problem in related art that the information processing solution related to beam indication increases the system complexity and the signaling indication overhead.

In order to solve the above-mentioned technical problem, the embodiments of the present disclosure provide an information processing method performed by a terminal, which includes:

receiving a beam indication signaling sent by a network device;

sending and/or receiving a channel and/or a reference signal corresponding to a target beam according to the beam indication signaling and beam configuration information, wherein the beam indication signaling includes at least one activated Transmission Configuration Indicator (TCI) state group; and the beam configuration information includes: at least one associated beam parameter corresponding to at least one channel and/or at least one reference signal.

Optionally, the sending and/or receiving the channel and/or the reference signal corresponding to the target beam according to the beam indication signaling and the beam configuration information includes:

determining the target beam according to the TCI state group in the beam indication signaling;

determining the channel and/or the reference signal corresponding to the target beam according to the beam indication signaling and the beam configuration information; and sending and/or receiving the channel and/or the reference signal corresponding to the target beam by using the target beam.

Optionally, the determining the channel and/or the reference signal corresponding to the target beam according to the beam indication signaling and the beam configuration information includes:

determining a target beam identifier associated with the target beam according to the beam indication signaling; and determining the channel and/or the reference signal corresponding to the target beam according to the target beam identifier and the beam configuration information.

Optionally, the at least one associated beam parameter corresponds to a working mode, and the at least one associated beam parameter indicates one or more beam identifiers corresponding to the channel and/or the reference signal corresponding to the associated beam parameter in the working mode.

Optionally, the working mode includes: at least one of a joint uplink and downlink beam mode and an independent uplink and downlink beam mode.

Optionally, the beam identifier includes a first beam identifier indicating that a first working mode is invalid; and a beam mode other than the first working mode is used for the channel and/or the reference signal corresponding to the first beam identifier.

Optionally, a quantity of the beam identifiers is predefined or indicated by the network device.

Optionally, the TCI state group corresponds to at least one beam identifier; and/or, the TCI state group includes at least one TCI state or TCI state combination.

Optionally, the method further includes: updating the at least one beam identifier according to an update indication sent by the network device.

Optionally, in a case that the beam indication signaling includes at least two activated TCI state groups, the beam indication signaling further includes: Downlink Control Information (DCI) configured to indicate at least one target beam identifier and a corresponding target TCI state group, wherein the DCI includes two levels of DCI or one level of DCI.

Optionally, in a case that the DCI includes two levels of DCI, the two levels of DCI include a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI includes one level of DCI, the one level of DCI includes at least two TCI fields, each of the at least two TCI fields indicates a target TCI state group corresponding to a corresponding beam identifier; the corresponding beam identifier includes the target beam identifier; and/or, in a case that the DCI includes one level of DCI, the one level of DCI includes a beam identifier field and a TCI field, the beam identifier field is configured to indicate the target beam identifier, and the TCI field is configured to indicate the target TCI state group corresponding to the target beam identifier.

Optionally, prior to the sending and/or receiving the channel and/or the reference signal corresponding to the target beam according to the beam indication signaling and the beam configuration information, the method further includes: receiving the beam configuration information sent by the network device.

The embodiments of the present disclosure further provide an information processing method performed by a network device. The method includes:

determining a beam indication signaling and sending the beam indication signaling to a terminal;

sending and/or receiving a channel and/or a reference signal corresponding to a target beam according to the beam indication signaling and beam configuration information, wherein the beam indication signaling includes: at least one activated Transmission Configuration Indicator (TCI) state group; and the beam configuration information includes: at least one associated beam parameter corresponding to at least one channel and/or at least one reference signal.

Optionally, the sending and/or receiving the channel and/or the reference signal corresponding to the target beam according to the beam indication signaling and the beam configuration information includes:

determining the target beam according to the at least one TCI state group in the beam indication signaling;

determining the channel and/or the reference signal corresponding to the target beam according to the beam indication signaling and the beam configuration information; and sending and/or receiving the channel and/or the reference signal corresponding to the target beam by using the target beam.

Optionally, the determining the channel and/or the reference signal corresponding to the target beam according to the beam indication signaling and the beam configuration information includes:

determining a target beam identifier associated with the target beam according to the beam indication signaling; and determining the channel and/or the reference signal corresponding to the target beam according to the target beam identifier and the beam configuration information.

Optionally, the at least one associated beam parameter corresponds to a working mode, and the at least one associated beam parameter indicates one or more beam identifiers corresponding to the channel and/or the reference signal corresponding to the associated beam parameter in the working mode.

Optionally, the working mode includes: at least one of a joint uplink and downlink beam mode and an independent uplink and downlink beam mode.

Optionally, the beam identifier includes a first beam identifier indicating that a first working mode is invalid; and other working modes other than the first working mode is used for the channel and/or the reference signal corresponding to the first beam identifier.

Optionally, a quantity of beam identifiers is predefined or indicated by the network device.

Optionally, the TCI state group corresponds to at least one beam identifier; and/or, the TCI state group includes at least one TCI state or TCI state combination.

Optionally, the method further includes:

determining an update indication and sending the update indication to the terminal; and updating the at least one beam identifier according to the update indication.

Optionally, in a case that the beam indication signaling includes at least two activated TCI state groups, the beam indication signaling further includes: Downlink Control Information (DCI) configured to indicate at least one target beam identifier and a corresponding target TCI state group, wherein the DCI includes two levels of DCI or one level of DCI.

Optionally, in a case that the DCI includes two levels of DCI, the two levels of DCI include a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI includes one level of DCI, the one level of DCI includes at least two TCI fields, each of the at least two TCI fields indicates a target TCI state group corresponding to a corresponding beam identifier; the corresponding beam identifier includes the target beam identifier; and/or, in a case that the DCI includes one level of DCI, the one level of DCI includes a beam identifier field and a TCI field, the beam identifier field is configured to indicate the target beam identifier, and the TCI field is configured to indicate the target TCI state group corresponding to the target beam identifier.

Optionally, prior to the sending and/or receiving the channel and/or the reference signal corresponding to the target beam according to the beam indication signaling and the beam configuration information, the method further includes:

determining the beam configuration information, and sending the beam configuration information to the terminal.

The embodiments of the present disclosure also provide a terminal, which includes a memory, a transceiver, and a processor, wherein, the memory is configured to store a computer program; the transceiver is configured to send and/or receive data under a control of the processor; the processor is configured to read the computer program in the memory and perform the following operations of:

receiving, through the transceiver, a beam indication signaling sent by a network device;

sending and/or receiving, through the transceiver, a channel and/or a reference signal corresponding to a target beam according to the beam indication signaling and beam configuration information, wherein the beam indication signaling includes at least one activated Transmission Configuration Indicator (TCI) state group; and the beam configuration information includes: at least one associated beam parameter corresponding to at least one channel and/or at least one reference signal.

Optionally, the sending and/or receiving the channel and/or the reference signal corresponding to the target beam according to the beam indication signaling and the beam configuration information includes:

determining the target beam according to the TCI state group in the beam indication signaling;

determining the channel and/or the reference signal corresponding to the target beam according to the beam indication signaling and the beam configuration information; and sending and/or receiving the channel and/or the reference signal corresponding to the target beam by using the target beam.

Optionally, the determining the channel and/or the reference signal corresponding to the target beam according to the beam indication signaling and the beam configuration information includes:

determining a target beam identifier associated with the target beam according to the beam indication signaling; and determining the channel and/or the reference signal corresponding to the target beam according to the target beam identifier and the beam configuration information.

Optionally, the at least one associated beam parameter corresponds to a working mode, and the at least one associated beam parameter indicates one or more beam identifiers corresponding to the channel and/or the reference signal corresponding to the associated beam parameter in the working mode.

Optionally, the working mode includes: at least one of a joint uplink and downlink beam mode and an independent uplink and downlink beam mode.

Optionally, the beam identifier includes a first beam identifier indicating that a first working mode is invalid; and a beam mode other than the first working mode is used for the channel and/or the reference signal corresponding to the first beam identifier.

Optionally, a quantity of the beam identifiers is predefined or indicated by the network device.

Optionally, the TCI state group corresponds to at least one beam identifier; and/or, the TCI state group includes at least one TCI state or TCI state combination.

Optionally, the operation further includes:

updating the at least one beam identifier according to an update indication sent by the network device.

Optionally, in a case that the beam indication signaling includes at least two activated TCI state groups, the beam indication signaling further includes:

Downlink Control Information (DCI) configured to indicate at least one target beam identifier and a corresponding target TCI state group, wherein the DCI includes two levels of DCI or one level of DCI.

Optionally, in a case that the DCI includes two levels of DCI, the two levels of DCI include a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI includes one level of DCI, the one level of DCI includes at least two TCI fields, each of the at least two TCI fields indicates a target TCI state group corresponding to a corresponding beam identifier; the corresponding beam identifier includes the target beam identifier; and/or, in a case that the DCI includes one level of DCI, the one level of DCI includes a beam identifier field and a TCI field, the beam identifier field is configured to indicate the target beam identifier, and the TCI field is configured to indicate the target TCI state group corresponding to the target beam identifier.

Optionally, the operation further includes: receiving, through the transceiver, the beam configuration information sent by the network device, prior to the sending and/or receiving a channel and/or a reference signal corresponding to a target beam according to the beam indication signaling and the beam configuration information.

The embodiments of the present disclosure also provide a network device, which includes a memory, a transceiver, and a processor, wherein the memory is configured to store a computer program; the transceiver is configured to send and/or receive data under a control of the processor; and the processor is configured to read the computer program in the memory and perform the following operations of:

determining a beam indication signaling and sending the beam indication signaling to a terminal through the transceiver;

sending and/or receiving, through the transceiver, a channel and/or a reference signal corresponding to a target beam according to the beam indication signaling and beam configuration information, wherein the beam indication signaling includes: at least one activated Transmission Configuration Indicator (TCI) state group; and the beam configuration information includes: at least one associated beam parameter corresponding to at least one channel and/or at least one reference signal.

Optionally, the sending and/or receiving the channel and/or the reference signal corresponding to the target beam according to the beam indication signaling and the beam configuration information includes:

determining the target beam according to the at least one TCI state group in the beam indication signaling;

determining the channel and/or the reference signal corresponding to the target beam according to the beam indication signaling and the beam configuration information; and sending and/or receiving the channel and/or the reference signal corresponding to the target beam by using the target beam.

Optionally, the determining the channel and/or the reference signal corresponding to the target beam according to the beam indication signaling and the beam configuration information includes:

determining a target beam identifier associated with the target beam according to the beam indication signaling; and determining the channel and/or the reference signal corresponding to the target beam according to the target beam identifier and the beam configuration information.

Optionally, the at least one associated beam parameter corresponds to a working mode, and the at least one associated beam parameter indicates one or more beam identifiers corresponding to the channel and/or the reference signal corresponding to the associated beam parameter in the working mode.

Optionally, the working mode includes: at least one of a joint uplink and downlink beam mode and an independent uplink and downlink beam mode.

Optionally, the beam identifier includes a first beam identifier indicating that a first working mode is invalid; and a beam mode other than the first working mode is used for the channel and/or the reference signal corresponding to the first beam identifier.

Optionally, a quantity of the beam identifiers is predefined or indicated by the network device.

Optionally, the TCI state group corresponds to at least one beam identifier; and/or, the TCI state group includes at least one TCI state or TCI state combination.

Optionally, the operation further includes:

determining an update indication and sending the update indication to the terminal; and updating the at least one beam identifier according to the update indication.

Optionally, in a case that the beam indication signaling includes at least two activated TCI state groups, the beam indication signaling further includes:

Downlink Control Information (DCI) configured to indicate at least one target beam identifier and a corresponding target TCI state group, wherein the DCI includes two levels of DCI or one level of DCI.

Optionally, in a case that the DCI includes two levels of DCI, the two levels of DCI include a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI includes one level of DCI, the one level of DCI includes at least two TCI fields, each of the at least two TCI fields indicates a target TCI state group corresponding to a corresponding beam identifier; the corresponding beam identifier includes the target beam identifier; and/or, in a case that the DCI includes one level of DCI, the one level of DCI includes a beam identifier field and a TCI field, the beam identifier field is configured to indicate the target beam identifier, and the TCI field is configured to indicate the target TCI state group corresponding to the target beam identifier.

Optionally, the operation further includes: determining the beam configuration information, and sending, through the transceiver, the beam configuration information to the terminal, prior to the sending and/or receiving a channel and/or a reference signal corresponding to a target beam according to the beam indication signaling and the beam configuration information.

The embodiments of the present disclosure also provide an information processing apparatus applied to a terminal, the apparatus includes:

a first receiving unit, configured to receive a beam indication signaling sent by a network device;

a first sending and receiving unit, configured to send and/or receive a channel and/or a reference signal corresponding to a target beam according to the beam indication signaling and beam configuration information, wherein the beam indication signaling includes at least one activated Transmission Configuration Indicator (TCI) state group; and the beam configuration information includes: at least one associated beam parameter corresponding to at least one channel and/or at least one reference signal.

Optionally, the sending and/or receiving the channel and/or the reference signal corresponding to the target beam according to the beam indication signaling and the beam configuration information includes:

determining the target beam according to the TCI state group in the beam indication signaling;

determining the channel and/or the reference signal corresponding to the target beam according to the beam indication signaling and the beam configuration information; and sending and/or receiving the channel and/or the reference signal corresponding to the target beam by using the target beam.

Optionally, the determining the channel and/or the reference signal corresponding to the target beam according to the beam indication signaling and the beam configuration information includes:

determining a target beam identifier associated with the target beam according to the beam indication signaling; and determining the channel and/or the reference signal corresponding to the target beam according to the target beam identifier and the beam configuration information.

Optionally, the at least one associated beam parameter corresponds to a working mode, and the at least one associated beam parameter indicates one or more beam identifiers corresponding to the channel and/or the reference signal corresponding to the associated beam parameter in the working mode.

Optionally, the working mode includes: at least one of a joint uplink and downlink beam mode and an independent uplink and downlink beam mode.

Optionally, the beam identifier includes a first beam identifier indicating that a first working mode is invalid; and a beam mode other than the first working mode is used for the channel and/or the reference signal corresponding to the first beam identifier.

Optionally, a quantity of the beam identifiers is predefined or indicated by the network device.

Optionally, the TCI state group corresponds to at least one beam identifier; and/or, the TCI state group includes at least one TCI state or TCI state combination.

Optionally, the apparatus further includes:

a first updating unit, configured update the at least one beam identifier according to an update indication sent by the network device.

Optionally, in a case that the beam indication signaling includes at least two activated TCI state groups, the beam indication signaling further includes:

Downlink Control Information (DCI) configured to indicate at least one target beam identifier and a corresponding target TCI state group, wherein the DCI includes two levels of DCI or one level of DCI.

Optionally, in a case that the DCI includes two levels of DCI, the two levels of DCI include a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI includes one level of DCI, the one level of DCI includes at least two TCI fields, each of the at least two TCI fields indicates a target TCI state group corresponding to a corresponding beam identifier; the corresponding beam identifier includes the target beam identifier; and/or, in a case that the DCI includes one level of DCI, the one level of DCI includes a beam identifier field and a TCI field, the beam identifier field is configured to indicate the target beam identifier, and the TCI field is configured to indicate the target TCI state group corresponding to the target beam identifier.

Optionally, the apparatus further includes:

a second receiving unit, configured to, prior to the sending and/or receiving the channel and/or the reference signal corresponding to the target beam according to the beam indication signaling and the beam configuration information, receive the beam configuration information sent by the network device.

The embodiments of the present disclosure also provide an information processing apparatus applied to a network device, the apparatus includes:

a first processing unit, configured to determine a beam indication signaling and send the beam indication signaling to a terminal;

a second sending and receiving unit, configured to send and/or receive a channel and/or a reference signal corresponding to a target beam according to the beam indication signaling and beam configuration information, wherein the beam indication signaling includes: at least one activated Transmission Configuration Indicator (TCI) state group; and the beam configuration information includes: at least one associated beam parameter corresponding to at least one channel and/or at least one reference signal.

Optionally, the sending and/or receiving the channel and/or the reference signal corresponding to the target beam according to the beam indication signaling and the beam configuration information includes:

determining the target beam according to the at least one TCI state group in the beam indication signaling;

determining the channel and/or the reference signal corresponding to the target beam according to the beam indication signaling and the beam configuration information; and sending and/or receiving the channel and/or the reference signal corresponding to the target beam by using the target beam.

Optionally, the determining the channel and/or the reference signal corresponding to the target beam according to the beam indication signaling and the beam configuration information includes:

determining a target beam identifier associated with the target beam according to the beam indication signaling; and determining the channel and/or the reference signal corresponding to the target beam according to the target beam identifier and the beam configuration information.

Optionally, the at least one associated beam parameter corresponds to a working mode, and the at least one associated beam parameter indicates one or more beam identifiers corresponding to the channel and/or the reference signal corresponding to the associated beam parameter in the working mode.

Optionally, the working mode includes: at least one of a joint uplink and downlink beam mode and an independent uplink and downlink beam mode.

Optionally, the beam identifier includes a first beam identifier indicating that a first working mode is invalid; and other working modes other than the first working mode is used for the channel and/or the reference signal corresponding to the first beam identifier.

Optionally, a quantity of beam identifiers is predefined or indicated by the network device.

Optionally, the TCI state group corresponds to at least one beam identifier; and/or, the TCI state group includes at least one TCI state or TCI state combination.

Optionally, the apparatus further includes:

a second processing unit, configured to determine an update indication and send the update indication to the terminal; and a second updating unit, configured to update the at least one beam identifier according to the update indication.

Optionally, in a case that the beam indication signaling includes at least two activated TCI state groups, the beam indication signaling further includes:

Downlink Control Information (DCI) configured to indicate at least one target beam identifier and a corresponding target TCI state group, wherein the DCI includes two levels of DCI or one level of DCI.

Optionally, in a case that the DCI includes two levels of DCI, the two levels of DCI include a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI includes one level of DCI, the one level of DCI includes at least two TCI fields, each of the at least two TCI fields indicates a target TCI state group corresponding to a corresponding beam identifier; the corresponding beam identifier includes the target beam identifier; and/or, in a case that the DCI includes one level of DCI, the one level of DCI includes a beam identifier field and a TCI field, the beam identifier field is configured to indicate the target beam identifier, and the TCI field is configured to indicate the target TCI state group corresponding to the target beam identifier.

Optionally, the apparatus also includes:

a third processing unit, configured to, prior to the sending and/or receiving the channel and/or the reference signal corresponding to the target beam according to the beam indication signaling and the beam configuration information, determine the beam configuration information, and send the beam configuration information to the terminal.

The embodiments of the present disclosure also provide a processor-readable storage medium, the processor-readable storage medium is stored with a computer program, the computer program is configured to cause a processor to execute the above-mentioned terminal-side information processing method; or, the processor-readable storage medium is stored with the computer program, and the computer program is configured to cause the processor to execute the above-mentioned network device-side information processing method.

The beneficial effects of the above-mentioned technical solutions of the present disclosure are as follows:

in the above-mentioned solutions, the information processing method includes: receiving a beam indication signaling sent by a network device; sending and/or receiving a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal, which can realize that one associated beam parameter indicates the target beam, that is, the corresponding target beam is indicated to the channel and/or the reference signal corresponding to the associated beam parameter, instead of having to perform independent beam indication for each channel; thereby saving beam indication signaling overhead and reducing system complexity while ensuring a certain beam flexibility, and well solving the problem in related art that the information processing solution related to beam indication increases system complexity and signaling indication overhead.

BRIEF DESCRIPTION OF THE DRAWINGS

FIG. 1 is a schematic view of a radio communication system architecture according to some embodiments of the present disclosure;

FIG. 2 is a first flowchart of an information processing method according to some embodiments of the present disclosure;

FIG. 3 is a second flowchart of an information processing method according to some embodiments of the present disclosure;

DETAILED DESCRIPTION

Figure 4:
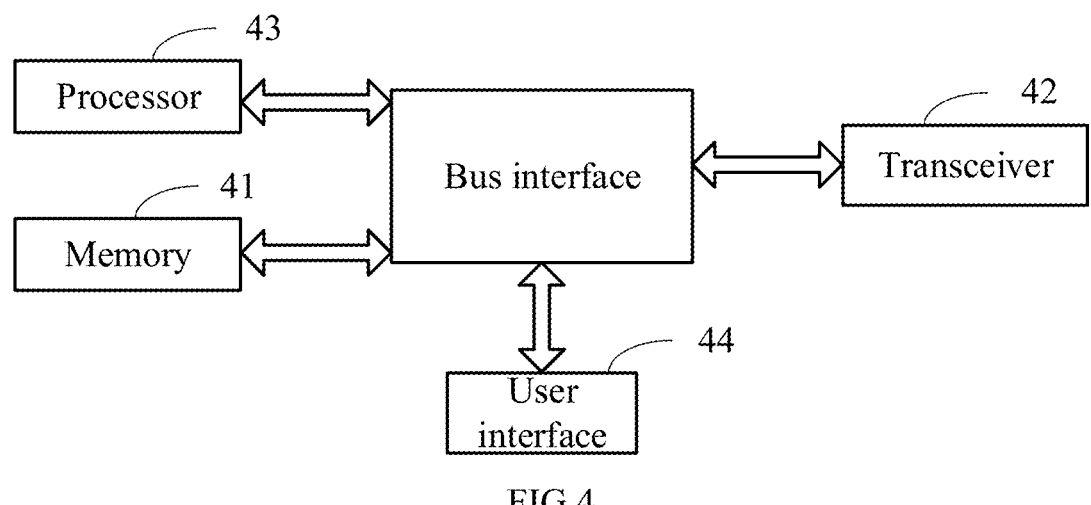
FIG. 4 is a schematic structural view of a terminal according to some embodiments of the present disclosure.

The technical solutions in the embodiments of the present disclosure will be clearly and completely described below with reference to the drawings in the embodiments of the present disclosure, obviously, the described embodiments are only parts of the embodiments of the present disclosure, rather than all of embodiments. Based on the embodiments in the present disclosure, all other embodiments obtained by those ordinarily skilled in the art without making creative efforts fall within the scope of protection of the present disclosure.

In the embodiments of the present disclosure, the term "and/or" describes the association relationship of associated objects, indicating that there may be three relationships, for example, A and/or B can mean these three situations: A exists alone, A and B exist simultaneously, and B exists alone. The character "/" generally indicates that the related objects are in the "or" relationship.

In the embodiments of the present disclosure, the term "plurality" refers to two or more than two, and other quantifiers are similar to it.

It is explained here that the technical solutions provided by the embodiments of the present disclosure may be applied to a variety of systems, especially fifth-generation (5th-Generation, 5G) mobile communication system. For example, applicable systems may be a global system of mobile communication (GSM) system, a Code Division Multiple Access (CDMA) system, a Wideband Code Division Multiple Access (WCDMA) system, a general packet radio service (GPRS) system, a long term evolution (LTE)

system, a LTE frequency division duplex (FDD) system, a LTE time division duplex (TDD) system, a long term evolution advanced (LTE-A) system, a universal mobile telecommunication system (UMTS), a worldwide interoperability for microwave access (WiMAX) system, a 5G New Radio (NR) system, etc. These various systems include terminals and network devices. The system may also include core network parts, such as the Evolved Packet System (EPS), 5G System (5GS), etc.

FIG. 1 shows a block diagram of a radio communication system to which the embodiments of the present disclosure is applicable, the radio communication system includes a terminal and a network device.

The terminal involved in the embodiments of the present disclosure may be a device that provides voice and/or data connectivity to users, a handheld device with a radio connection function, or other processing devices connected to a radio modem, etc. In different systems, names of the terminal may be different. For example, in the 5G system, the terminal may be called user equipment (UE). The radio terminal may communicate with one or more core networks (CN) via the radio access network (RAN), the radio terminal may be a mobile terminal, such as a mobile phone (or "cellular" phone) and a computer with a mobile terminal, may be, for example, portable, or pocket-sized, or handheld, or computer-built-in or vehicle-mounted mobile apparatuses, which exchange voice and/or data with the radio access network. For example, Personal Communication Service (PCS) phones, cordless phones, Session Initiated Protocol (SIP) phones, Wireless Local Loop (WLL) stations, Personal Digital Assistants (PDA) and other devices. A radio terminal may also be called a system, a subscriber unit, a subscriber station, a mobile station, a mobile, a remote station, an access point, a remote terminal device (remote terminal), an access terminal device (access terminal), a user terminal device (user terminal), a user agent, and a user device are not limited in the embodiments of the present disclosure.

The network device involved in the embodiments of the present disclosure may be a base station, and the base station may include multiple cells that provide services for terminals. Depending on the specific application scenarios, the base station may also be called an access point, or a device, in the access network, which communicates with radio terminals through one or more sectors on the air interface, or other names. The network device may be used to interchange received air frames with Internet Protocol (IP) packets and act as a router between the radio terminals and the rest of the access network, where the rest of the access network may include an Internet Protocol (IP) communication network. The network device may also coordinate attribute management of the air interface. For example, the network device involved in the embodiments of the present disclosure may be a network device (Base Transceiver Station, BTS) in the Global System for Mobile communications (GSM) or the Code Division Multiple Access (CDMA) system, or a network device (NodeB) in a Wideband Code Division Multiple Access (WCDMA), or an evolutional network device (evolutional Node B, eNB or e-NodeB) in a long term evolution (LTE) system, a 5G base station (gNB) in a 5G network architecture (next generation system), or a home evolved base station (Home evolved Node B, HeNB), a relay node, a home base station (femto), a pico base station (pico), etc., which are not limited in the embodiments of the present disclosure. In some network structures, network devices may include centralized unit (CU) nodes and distributed unit (DU) nodes, and the centralized units and distributed units may also be arranged geographically separately.

The network device and the terminal may each use one or more antennas for Multi-Input Multi-Output (MIMO) transmission, MIMO transmission may be single-user MIMO (Single User MIMO, SU-MIMO) or multi-user MIMO (Multiple User MIMO, MU-MIMO). Depending on the shape and the quantity of root antenna combinations, MIMO transmission may be two-dimensional MIMO (2 Dimension MIMO, 2D-MIMO), three-dimensional MIMO (3 Dimension MIMO, 3D-MIMO), full dimensional MIMO (Full Dimension MIMO, FD-MIMO) or massive MIMO (massive-MIMO), or diversity transmission, precoding transmission or beamforming transmission, etc.

The content involved in the solutions provided by the embodiments of the present disclosure is first introduced below.

In the NR (New Radio) system, downlink channels include the Physical Downlink Shared Channel (PDSCH) and the Physical Downlink Control Channel (PDCCH), and uplink channels include the Physical Uplink Shared Channel (PUSCH) and the Physical Uplink Control Channel (PUCCH). For high-frequency transmission (FR2 frequency band in NR), due to the limited transmission range, uplink and downlink channels are usually transmitted after beamforming so as to enhance coverage. The direction of the beamshaped beam may be determined by beam scanning of uplink and downlink reference signals, such as using Channel State Information Reference Signals (CSI-RS) or channel Sounding Reference Signals (SRS) in different directions to perform the beam scanning, and selecting the direction of the reference signal with the best beam quality for uplink or downlink transmission. After determining the beam directions of different channels, signaling, i.e., beam indication, needs to be used to indicate the beam for channel transmission. In the NR Release (version)-15 or 16 protocol, for the PUCCH channel, the base station semi-statically configures multiple beam directions for the terminal through high-level signaling SpatialRelationInfo, and indicates activation of one of the beam directions through the Media Access Control Control Element (MAC-CE). For the PUSCH, the uplink beam selected by the base station is indirectly indicated by the SpatialRelationInfo of the SRS resource indicated by the SRS resource indicator (SRI) field in the dynamic signaling of the downlink control information (DCI). For the PDCCH channel, the base station configures multiple Transmission Configuration Indicator (TCI) states for each Control Resource Set (CORESET) through high-level signaling, and indicates activation of one of the TCI states through the MAC-CE. For the PDSCH channel, the base station indicates one TCI state through the TCI field in the DCI signaling, to indicate the beam direction of the channel.

Based on the above, the embodiments of the present disclosure provide an information processing method, an information processing apparatus, a terminal and a network device, so as to solve the problem in related art that information processing solution related to the beam indication increases the system complexity and signaling indication overhead, where the method, apparatus, terminal and network device are conceived based on the same application. Since the method, apparatus, terminal and network device have similar principles for solving problems, the implementation of the method, apparatus, terminal and network device may be referred to each other, and the repetitions will not be repeated.

An embodiment of the present disclosure provides an information processing method, performed by a terminal, as shown in FIG. 2, the method includes:

Step 21: receiving a beam indication signaling sent by a network device; wherein the network device may be a base station;

Step 22: sending and/or receiving a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal. Specifically, the step may include: determining a beam identifier corresponding to the TCI state group in the beam indication signaling; and sending and/or receiving the channel and/or the reference signal corresponding to the determined beam identifier in the associated beam parameter using the target beam corresponding to the determined beam identifier.

The beam configuration information may be sent by the network device in advance and stored locally in the terminal, or, may be sent together with the beam indication signaling, for example, when the beam indication signaling is sent for the first time, the beam configuration information is sent together, which is not limited here.

The information processing method provided by the embodiment in the present disclosure includes: receiving a beam indication signaling sent by a network device; sending and/or receiving a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal, which can realize that one associated beam parameter indicates the target beam, that is, the corresponding target beam can be indicated to the channel and/or the reference signal corresponding to the associated beam parameter, instead of having to perform independent beam indication for each channel; thereby saving a beam indication signaling overhead and reducing system complexity while ensuring a certain beam flexibility, and well solving the problem in related art that the information processing solution related to beam indication increases system complexity and signaling indication overhead.

In the embodiments of the present disclosure, the sending and/or receiving the channel and/or the reference signal corresponding to the target beam according to the beam indication signaling and the beam configuration information includes: determining the target beam according to the TCI state group in the beam indication signaling; determining the channel and/or the reference signal corresponding to the target beam according to the beam indication signaling and the beam configuration information; and using the target beam to send and/or receive the corresponding channel and/or the corresponding reference signal.

The determining the channel and/or the reference signal corresponding to the target beam according to the beam indication signaling and the beam configuration information includes: determining a target beam identifier associated with the target beam according to the beam indication signaling; and determining the channel and/or the reference signal corresponding to the target beam according to the target beam identifier and the beam configuration information.

In the embodiments of the present disclosure, the determining the channel and/or the reference signal corresponding to the target beam according to the target beam identifier and the beam configuration information may specifically include: matching the target beam identifier with the beam identifier (i.e., the beam identifier corresponding to the channel and/or the reference signal corresponding to the associated beam parameter) indicated by the associated beam parameter in the beam configuration information; and determining (that is, obtaining) the channel and/or the reference signal corresponding to the target beam according to the channel and/or the reference signal corresponding to the beam identifier that matches the target beam identifier.

In the embodiments of the present disclosure, the associated beam parameter corresponds to a working mode, and the associated beam parameter indicates the corresponding beam identifier of the channel and/or the reference signal corresponding to the associated beam parameter in the working mode.

The "corresponding beam identifier" may be implemented as "the used beam index", which is not limited here.

The working mode includes: at least one of a joint uplink and downlink beam mode and an independent uplink and downlink beam mode.

In the embodiments of the present disclosure, the beam identifier includes a first beam identifier indicating that a first working mode is invalid; and other beam modes other than the first working mode is used for the channel and/or the reference signal corresponding to the first beam identifier, which can also be understood that the first working mode is not used for the channel and/or the reference signal corresponding to the first beam identifier.

A quantity of beam identifiers is predefined or indicated by the network device.

In the embodiments of the present disclosure, the TCI state group corresponds to at least one beam identifier; and/or, the TCI state group includes at least one TCI state or TCI state combination.

"At least one beam identifier" may be implemented as "at least one beam index", which is not limited here.

Further, the information processing method further includes: updating the at least one beam identifier according to an update indication sent by the network device.

This makes the solution more flexible.

In the embodiments of the present disclosure, in a case that the beam indication signaling includes at least two activated TCI state groups, the beam indication signaling further includes: downlink control information (DCI) configured to indicate at least one target beam identifier and a corresponding target TCI state group, where the DCI includes two levels of DCI or one level of DCI;

in a case that the DCI includes two levels of DCI, the DCI includes a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI includes one level of DCI, the DCI includes at least two TCI fields, each of TCI fields indicates a target TCI state group (in this case, there is a preset corresponding relationship between the TCI fields and beam identifiers) corresponding to the beam identifier; the corresponding beam identifier includes the target beam identifier; and/or, in a case that the DCI includes one level of DCI, the DCI includes a beam identifier field and the TCI field, the beam identifier field is configured to indicate the target beam identifier, and the TCI field is configured to indicate the target TCI state group corresponding to the target beam identifier.

Further, prior to the sending and/or receiving the channel and/or the reference signal corresponding to the target beam according to the beam indication signaling and the beam configuration information further includes: receiving the beam configuration information sent by the network device.

This facilitates subsequent use of beam configuration information.

An embodiment of the present disclosure provides an information processing method, performed by a network device, as shown in FIG. 3, the method includes:

Step 31: determining a beam indication signaling and sending the beam indication signaling to a terminal; and the network device may be a base station.

Step 32: sending and/or receiving a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal.

Specifically, the step may include: determining the beam identifier corresponding to the TCI state group in the beam indication signaling; and sending and/or receiving the channel and/or the reference signal corresponding to the determined beam identifier in the associated beam parameter using the target beam corresponding to the determined beam identifier.

The beam configuration information may be sent by the network device in advance and stored locally in the terminal, or, may be sent together with the beam indication signaling, for example, when the beam indication signaling is sent for the first time, the beam configuration information is sent together, which is not limited here.

The information processing method provided by the embodiment in the present disclosure includes: determining a beam indication signaling and sending the beam indication signaling to a terminal; sending and/or receiving a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal, which can realize that one associated beam parameter indicates the target beam, that is, the corresponding target beam is indicated to the channel and/or the reference signal corresponding to the associated beam parameter, instead of having to perform independent beam indication for each channel; thereby saving beam indication signaling overhead and reducing system complexity while ensuring a certain beam flexibility, and well solving the problem in related art that the information processing solution related to beam indication increases system complexity and signaling indication overhead.

In the embodiments of the present disclosure, the sending and/or receiving the channel and/or the reference signal corresponding to the target beam according to the beam indication signaling and the beam configuration information includes: determining the target beam according to the TCI state group in the beam indication signaling; determining the channel and/or the reference signal corresponding to the target beam according to the beam indication signaling and the beam configuration information; and using the target beam to send and/or receive the corresponding channel and/or the corresponding reference signal.

The determining the channel and/or the reference signal corresponding to the target beam according to the beam indication signaling and the beam configuration information includes: determining a target beam identifier associated with the target beam according to the beam indication signaling; and determining the channel and/or the reference signal corresponding to the target beam according to the target beam identifier and the beam configuration information.

In the embodiments of the present disclosure, the determining the channel and/or the reference signal corresponding to the target beam according to the target beam identifier and the beam configuration information may specifically include: matching the target beam identifier with the beam identifier (i.e., the beam identifier corresponding to the channel and/or the reference signal corresponding to the associated beam parameter) indicated by the associated beam parameter in the beam configuration information; and determining (that is, obtaining) the channel and/or the reference signal corresponding to the target beam according to the channel and/or the reference signal corresponding to the beam identifier that matches the target beam identifier.

In the embodiments of the present disclosure, the associated beam parameter corresponds to a working mode, and the associated beam parameter indicates the corresponding beam identifier of the channel and/or the reference signal corresponding to the associated beam parameter in the working mode.

The "corresponding beam identifier" may be implemented as "the used beam index", which is not limited here.

The working mode includes: at least one of a joint uplink and downlink beam mode and an independent uplink and downlink beam mode.

In the embodiments of the present disclosure, the beam identifier includes a first beam identifier indicating that a first working mode is invalid; and other beam modes other than the first working mode are used for the channel and/or the reference signal corresponding to the first beam identifier, which can also be understood that the first working mode is not used for the channel and/or the reference signal corresponding to the first beam identifier.

A quantity of beam identifiers is predefined or indicated by the network device.

In the embodiments of the present disclosure, the TCI state group corresponds to at least one beam identifier; and/or, the TCI state group includes at least one TCI state or TCI state combination.

"At least one beam identifier" may be implemented as "at least one beam index", which is not limited here.

Further, the information processing method further includes: determining an update indication and sending the update indication to the terminal; and updating the at least one beam identifier according to the update indication.

This makes the solution more flexible.

In the embodiments of the present disclosure, in a case that the beam indication signaling includes at least two activated TCI state groups, the beam indication signaling further includes: downlink control information (DCI) configured to indicate at least one target beam identifier and a corresponding target TCI state group, where the DCI includes two levels of DCI or one level of DCI;

in a case that the DCI includes two levels of DCI, the DCI includes a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI includes one level of DCI, the DCI includes at least two TCI fields, each of TCI fields indicates a target TCI state group (in this case, there is a preset corresponding relationship between the TCI fields and beam identifiers) corresponding to the beam identifier; the corresponding beam identifier includes the target beam identifier; and/or, in a case that the DCI includes one level of DCI, the DCI includes a beam identifier field and the TCI field, the beam identifier field is configured to indicate the target beam identifier, and the TCI field is configured to indicate the target TCI state group corresponding to the target beam identifier.

Further, prior to the sending and/or receiving the channel and/or the reference signal corresponding to the target beam according to the beam indication signaling and the beam configuration information further includes: determining the beam configuration information, and sending the beam configuration information to the terminal.

This facilitates subsequent use of beam configuration information.

The following gives examples of the information processing method provided by the embodiments of the present disclosure, in which the beam index is the example of the beam identifier, and the base station is the example of the network device.

In response to the above-mentioned technical problem, the embodiments of the present disclosure provide an information processing method, which may be implemented specifically as a beam indication method, which is used for indicating the channel and/or the reference signal to which the beam can be applied. Specifically, this solution may associate a beam index with each channel and/or reference signal; MAC-CE or DCI may be used to indicate the corresponding beams for channels and/or reference signals with different beam indexes. This solution saves beam indication signaling overhead and reduces system complexity while ensuring a certain beam flexibility.

This solution will be respectively described below from the terminal side and the base station side.

The solution for the terminal side includes:

1) receiving a configuration signaling (corresponding to the above-mentioned beam configuration information) of a channel and/or a reference signal sent by a base station and receiving a beam indication signaling (these two signalings may be received at the same time or not at the same time) sent by a base station. The configuration signaling of the channel and/or the reference signal includes: one or more associated beam parameters for each channel and/or each reference signal. The beam indication signaling includes: the (already) activated transmission configuration indicator (TCI) state group (which corresponds to the above-mentioned method that the beam configuration information includes: at least one associated beam parameter corresponding to at least one channel and/or at least one reference signal) indicated by MAC-CE. The beam identifier indicated by the associated beam parameter included in the configuration signaling includes the beam identifier corresponding to the beam indication signaling.

The terminal sends and receives the corresponding channel and/or the corresponding reference signal according to the configuration signaling and the beam indication signaling, which may specifically be: determining the target beam according to the TCI state group in the beam indication signaling; determining the channel and/or the reference signal corresponding to the target beam according to the beam indication signaling and the beam configuration information; and using the target beam to send and/or receive the corresponding channel and/or the corresponding reference signal, that is, determining the channel and/or the reference signal corresponding to the beam indicated by the beam indication signaling; and using the beam to send and/or receive the corresponding channel and/or the corresponding reference signal (i.e., the channel and/or the reference signal corresponding to the beam indicated by the indication signaling).

The determining the channel and/or the reference signal corresponding to the target beam according to the beam indication signaling and the beam configuration information may include: determining a target beam identifier associated with the target beam according to the beam indication signaling; and determining the channel and/or the reference signal corresponding to the target beam according to the target beam identifier and the beam configuration information.

2) In one or more associated beam parameters described in 1), each associated beam parameter corresponds to one (working) mode. The associated beam parameter indicates the beam index (corresponding to the above-mentioned beam identifier) used by this channel and/or reference signal (i.e., the channel and/or the reference signal corresponding to the associated beam parameter) in this mode.

3) The activated TCI state group indicated by MAC-CE as described in 1), includes:

a plurality of activated TCI state groups indicated by MAC-CE. Each activated TCI state group includes one or more TCI states or TCI state combinations. Each TCI state group corresponds to at least one beam index.

4) The beam indication signaling described in 1) also includes:

DCI signaling configured to indicate the beam, where the DCI signaling is configured to indicate a state or state combination (which may specifically refer to an uplink and downlink combination) selected from the plurality of TCI state groups activated by the MAC-CE, and corresponds to the above-mentioned downlink control information (DCI) configured to indicate at least one target beam identifier and a corresponding target TCI state group, where the DCI includes two levels of DCI or one level of DCI.

The beam indication signaling described in 1) also includes: one or more of the following methods:

using two levels of DCI to indicate, where the first level of DCI includes a beam index indication field, which indicates one or more beam indexes corresponding to the TCI state (in a joint uplink and downlink beam mode) or TCI state combination (in an independent uplink and downlink beam mode) in the second level of DCI, which corresponds to the above-mentioned method that the first level of DCI is configured to indicate at least one target beam identifier. The second level of DCI includes a TCI field, which indicates the TCI state or TCI state combination corresponding to one or more beam indexes in the first level, which corresponds to the above-mentioned method that the second level of DCI is configured to indicate a target TCI state group corresponding to the at least one target beam identifier;

using one level of DCI to indicate, where the DCI includes a plurality of TCI fields, each of fields indicates the TCI state or TCI state combination of the corresponding beam index (there is a preset corresponding relationship between the TCI fields and the beam indexes), which corresponds to the above-mentioned method that the DCI includes at least two TCI fields, each of TCI fields indicates a target TCI state group corresponding to a beam identifier; and using one level of DCI to indicate, where the DCI includes a beam index field (which may indicate the beam index) and a TCI field. The TCI field is configured to indicate the TCI state or TCI state combination corresponding to the beam index, which corresponds to the above-mentioned method that the DCI includes a beam identifier field and the TCI field, the beam identifier field is configured to indicate the target beam identifier, and the TCI field is configured to indicate the target TCI state group corresponding to the target beam identifier.

In this solution, the channel and/or the reference signal associated with the beam index indicated by the beam indication signaling is sent and received using the beam (that is, the TCI state) indicated by the beam indication signaling.

5) The mode described in 2) includes one or two of the joint uplink and downlink beam mode and the independent uplink and downlink beam mode.

6) The beam index described in 2) includes one index indicating that the mode is invalid. The index indicates that this mode is not used for the channel and/or the reference signal, which corresponds to the above-mentioned method that the beam identifier includes one first beam identifier indicating that a first working mode is invalid; and the first working mode is not used for the channel and/or the reference signal corresponding to the first beam identifier.

7) The quantity of beam indexes described in 2) is predefined by the system or indicated to the terminal by the base station, which corresponds to the above-mentioned method that the quantity of beam identifiers is predefined or indicated by the network device.

8) The beam index corresponding to each TCI state group described in 3) may be updated by the base station through the MAC-CE, which corresponds to the above-mentioned updating the at least one beam identifier according to an update indication sent by the network device.

The solution for the base station side includes:

1) determining a configuration signaling of a channel and/or a reference signal and sending the configuration signaling to the terminal; and determining a beam indication signaling (which may be determined according to the beam scanning result of the terminal) and sending the beam indication signaling to the terminal. The configuration signaling of the channel and/or the reference signal includes: one or more associated beam parameters for each channel and/or each reference signal. The beam indication signaling includes: the activated TCI state group (which corresponds to the above-mentioned method that the beam configuration information includes: at least one associated beam parameter corresponding to at least one channel and/or at least one reference signal) indicated by MAC-CE. The beam identifier indicated by the associated beam parameter included in the configuration signaling includes the beam identifier corresponding to the beam indication signaling;

Sending and receiving by the base station the corresponding channel and/or the corresponding reference signal according to the configuration signaling and the beam indication signaling, which may specifically be: determining the target beam according to the TCI state group in the beam indication signaling; determining the channel and/or the reference signal corresponding to the target beam according to the beam indication signaling and the beam configuration information; and using the target beam to send and/or receive the corresponding channel and/or the corresponding reference signal, that is, determining the channel and/or the reference signal corresponding to the beam indicated by the beam indication signaling; and using the beam to send and/or receive the corresponding channel and/or the corresponding reference signal (i.e., the channel and/or the reference signal corresponding to the beam indicated by the indication signaling).

The determining the channel and/or the reference signal corresponding to the target beam according to the beam indication signaling and the beam configuration information may include: determining a target beam identifier associated with the target beam according to the beam indication signaling; and determining the channel and/or the reference signal corresponding to the target beam according to the target beam identifier and the beam configuration information.

2) In one or more associated beam parameters described in 1), each associated beam parameter corresponds to one (working) mode. The associated beam parameter indicates the beam index (corresponding to the above-mentioned beam identifier) used for this channel and/or this reference signal (i.e., the channel and/or the reference signal corresponding to the associated beam parameter) in this mode.

3) The activated TCI state group indicated by MAC-CE as described in 1), includes:

a plurality of activated TCI state groups indicated by MAC-CE. Each activated TCI state group includes one or more TCI states or TCI state combinations. Each TCI state group corresponds to at least one beam index.

4) The beam indication signaling described in 1) also includes:

DCI signaling configured to indicate the beam, where the DCI signaling is configured to indicate a state or state combination (which may specifically refer to an uplink and downlink combination) selected from the plurality of TCI state groups activated by the MAC-CE, which corresponds to the above-mentioned downlink control information (DCI) configured to indicate at least one target beam identifier and a corresponding target TCI state group, where the DCI includes two levels of DCI or one level of DCI.

The beam indication signaling described in 1) also includes: one or more of the following methods:

using two levels of DCI to indicate, where the first level of DCI includes a beam index indication field, which indicates one or more beam indexes corresponding to the TCI state (in a joint uplink and downlink beam mode) or TCI state combination (in an independent uplink and downlink beam mode) corresponding to the second level of DCI, which corresponds to the above-mentioned method that the first level of DCI is configured to indicate at least one target beam identifier. The second level of DCI includes a TCI field, which indicates the TCI state or TCI state combination corresponding to one or more beam indexes in the first level, which corresponds to the above-mentioned method that the second level of DCI is configured to indicate a target TCI state group corresponding to the at least one target beam identifier;

using one level of DCI to indicate, where the DCI includes a plurality of TCI fields, each of fields indicates the TCI state or TCI state combination of the corresponding beam index (there is a preset corresponding relationship between the TCI fields and the beam indexes), which corresponds to the above-mentioned method that the DCI includes at least two TCI fields, each of TCI fields indicates a target TCI state group corresponding to a beam identifier; and using one level of DCI to indicate, where the DCI includes both a beam index field (which may indicate the beam index) and a TCI field. The TCI field is configured to indicate the TCI state or TCI state combination corresponding to the beam index, which corresponds to the above-mentioned method that the DCI includes a beam identifier field and the TCI field, the beam identifier field is configured to indicate the target beam identifier, and the TCI field is configured to indicate the target TCI state group corresponding to the target beam identifier.

In this solution, the channel and/or the reference signal associated with the beam index indicated by the beam indication signaling is sent and received using the beam (that is, the TCI state) indicated by the beam indication signaling.

5) The mode described in 2) includes one or more of a joint uplink and downlink beam mode and an independent uplink and downlink beam mode.

6) The beam index described in 2) includes an index indicating that the mode is invalid. The index indicates that this mode is not used for this channel and/or the reference signal, which corresponds to the above-mentioned method that the beam identifier includes one first beam identifier indicating that a first working mode is invalid; and the first working mode is not used for the channel and/or the reference signal corresponding to the first beam identifier.

7) The quantity of beam indexes described in 2) is predefined by the system or indicated to the terminal by the base station, which corresponds to the above-mentioned method that the quantity of beam identifiers is predefined or indicated by the network device.

8) The beam index corresponding to each TCI state group described in 3) may be updated by the base station through indication of the MAC-CE, which corresponds to the above-mentioned determining an update indication and sending the update indication to the terminal; and updating the at least one beam identifier according to the update indication.

The solutions provided by the embodiments of the present disclosure will be illustrated with the special examples below.

Example 1 the system supports the joint uplink and downlink beam mode and the independent uplink and downlink beam mode, which are represented as mode-0 and mode-1. For the mode-0, the system is predefined to support M=3 beam indexes, which are respectively represented as: A0, A1 and A2, where A2 indicates that the mode is invalid. For the mode-1, the system is predefined to support downlink Q=3 beam indexes, which are respectively represented as: B0, B1 and B2; the system is predefined to support uplink N=2 beam indexes, which are respectively represented as C0 and C1. For the mode-1, B2 indicates that the mode is invalid (applicable to both uplink and downlink). Each channel and reference signal respectively associates the beam parameters of the two of the mode-0 and the mode-1.

The base station uses a radio resource control (RRC) signaling to configure the channel and the reference signal as follows:

PDCCH is transmitted through CORESET0, CORESET1 and CORESET2, and associated beam parameters thereof are respectively configured as:
CORESET0: {mode-0: A0}, {mode-1: B0};
CORESET1: {mode-0: A0}, {mode-1: B0},
CORESET2: {mode-0: A1}, {mode-1: B1};
the beam parameters associated with PDSCH resources are configured as:
PDSCH: {mode-0: A1}, {mode-1: B1};
the beam parameters associated with CSI-RS resources are configured as:
CSI-RS: {mode-0: A2}, {mode-1: B2};
the beam parameters associated with PUCCH resources are configured as:
PUCCH: {mode-0: A1}, {mode-1: C1};
the beam parameters associated with PUSCH resources are configured as:
PUSCH: {mode-0: A1}, {mode-1: C1};
the beam parameters associated with SRS resources are configured as:
SRS: {mode-0: A2}, {mode-1: B2}.

Based on the above-mentioned configuration, the working mode for mode-0 may be determined, the same beam (indexed as A1) is used for CORESET2, PDSCH, PUCCH and PUSCH; the same beam (indexed as A0) is used for CORESET0 and CORESET1; CSI-RS and SRS do not work in a mode of the mode-0, and beams there of are configured by other means, such as an independent configuration method of Rel (version)-15 or 16 is reused. For mode-1, in the downlink channel, the same downlink beam (indexed as B1) is used for CORESET2 and PDSCH; the same downlink beam (indexed as B0) is used for CORESET0 and CORESET1; CSI-RS does not work in a mode of the mode-1. In the uplink channel, the same uplink beam (indexed as C1) is used for PUCCH and PUSCH, and SRS does not work in a mode of the mode-1.

The above-mentioned beam indexes may be modified through MAC-CE, for example, the beam of CORESET1 in the mode of mode-0 may be modified to A1, that is {mode-0: A1}.

The base station configures a TCI state pool including 5=128 TCI-States for the terminal, each state therein is indicated by the corresponding TCI-State Id, for example, the first TCI state therein is indicated by TCI-State0, the second TCI state is indicated by TCI-State1, and so on.

This solution may activate, through MAC-CE, TCI states from the TCI state pool configured by RRC. Mode indication may be included in this MAC-CE. For example, the MAC-CE indicates mode-0 at this time, which is the joint uplink and downlink beam mode. In this case, this MAC-CE activates M−1 TCI state groups, that is, activates 2 TCI state groups, and each state group includes 4 TCI states. A state group 1 corresponds to the beam indexed as A0, and a state group 2 corresponds to the beam (the indexes corresponding to state groups 1 and 2 may be exchanged) indexed as A1. For example, activating via MAC-CE:
state group 1: TCI_State2, TCI_State5, TCI_State7, TCI_State9;
state group 2: TCI_State100, TCI_State112, TCI_State120, TCI_State126;

DCI is further used to select a beam to be indicated, from the above-mentioned state groups activated by the MAC CE. One method is to use two levels of DCI, where the first level of DCI includes M−1=2 index fields, which correspond to the indexes A0 and A1 respectively, bit 0 indicates that the beam is not indicated, and bit 1 indicates that the beam is indicated. For example:

| Index field (A0) | Index field (A1) |
| --- | --- |
| 0 | 1 |

It represents that the second level of DCI only indicates the beam of A1. At this time, the second level of DCI includes one TCI field, which indicates the beam of A1. For example:

| TCI field |
| --- |
| 00 |

It represents that the beam corresponding to TCI_State100 is used by the channel of (associated with) the index A1 for transmission.

As an option, the first level of DCI indicates:

| Index field (A0) | Index field (A1) |
| --- | --- |
| 1 | 1 |

In this case, the second level of DCI includes two TCI fields, which respectively represent the beams of A0 and A1, for example:

| TCI field | TCI field |
| --- | --- |
| 01 | 10 |

It represents that the beam corresponding to TCI_State5 is used by the channel of (associated with) the index A0 for transmission, and the beam corresponding to TCI_State120 is used by the channel of (associated with) the index A1 for transmission.

Another indication method is to use one level of DCI, which always includes M−1=2 TCI fields. The first field corresponds to the beam of A0, and the second field corresponds to the beam of A1. For example:

| TCI field | TCI field |
| --- | --- |
| 11 | 10 |

It represents that the beam corresponding to TCI_State9 is used by the channel of (associated with) the index A0 for transmission, and the beam corresponding to TCI_State120 is used by the channel of (associated with) the index A1 for transmission.

Yet another indication method is to use one level of DCI, which includes one index field (corresponding to the above-mentioned beam index field) and one TCI field, the index field indicates the index A0 or the index A1. For example:

| Index field | TCI field |
|---|---|
| 1 | 10 |

It represents that the beam corresponding to TCI_State7 is used by the channel of (associated with) the index A1 for transmission.

Example 2 beam-related parameters of the channel and the reference signal are the same as those of Example 1 and will not be described again here.

The base station configures a TCI state pool including S=128 TCI-States for the terminal. Each state therein is indicated by the corresponding TCI-State Id. For example, the first TCI state therein is indicated by TCI-State0, the second TCI state is indicated by TCI-State1, and so on.

This solution may activate, through MAC-CE, the TCI states from the TCI state pool configured by RRC. Mode indication may be included in this MAC-CE. For example, the MAC-CE indicates mode-1, which is an independent uplink and downlink beam mode. At the same time, this MAC-CE activates Q−1 TCI state groups, that is, activates 2 TCI state groups, and each state group includes 4 TCI state combinations. State group 1 corresponds to the beam indexed as {B0, C0}, and state group 2 corresponds to the beam (the indexes corresponding to state groups 1 and 2 may be interchanged; uplink and downlink may correspond to different state groups) indexed as {B1, C1}. For example, being activated via MAC-CE:

State group 1: {TCI_State2, TCI_State12}, {TCI_State5, TCI_State15}, {TCI_State7, TCI_State17}, {TCI_State9, TCI_State19};

State group 2: {TCI_State100, TCI_State90}, {TCI_State120, TCI_State110}, {TCI_State112, TCI_State102}, {TCI_State126, TCI_State116};

DCI is further used to select a beam from the above-mentioned state group activated by the MAC-CE, for indication. One method is to use two levels of DCI, where the first level of DCI includes Q−1=N=2 index fields, which respectively corresponds to the indexes {B0, C0} and {B1, C1}, where bit 0 indicates that the beam is not indicated and bit 1 indicates that the beam is indicated. For example:

| Index field | Index field |
|---|---|
| 0 | 1 |

It represents that the second level of DCI only indicates the beam of {B1, C1}. In this case, the second level of DCI includes one TCI field, which indicates the beam of {B1, C1}. For example:

| TCI field |
|---|
| 00 |

The remaining DCI indication methods may also be used similarly and will not be described again.

Example 3

The system supports the joint uplink and downlink beam mode and the independent uplink and downlink beam mode, which are represented as mode-0 and mode-1. For the mode-0, the system is predefined to support M=3 beam indexes, which are respectively represented as: A0, A1 and A2, where A2 indicates that the mode is invalid. For the mode-1, the system is predefined to support downlink Q=3 beam indexes, which are respectively represented as B0, B1 and B2; the system is predefined to support uplink N=3 beam indexes, which are respectively represented as C0, C1 and C2. For the mode-1, B2 represents that the mode is invalid (applicable to both uplink and downlink). Each channel and each reference signal respectively associate with beam parameters of the two mode-0 and mode-1.

The base station uses an RRC signaling to configure channels and reference signals as follows:

PDCCH is transmitted through CORESET0, CORESET1 and CORESET2, and their associated beam parameters are respectively configured as:

CORESET0: {mode-0: A0}, {mode-1: B0};

CORESET1: {mode-0: A0}, {mode-1: B0};

CORESET2: {mode-0: A1}, {mode-1: B1};

the beam parameters associated with PDSCH resources are configured as:

PDSCH: {mode-0: A1}, {mode-1: B1};

the beam parameters associated with CSI-RS resources are configured as:

CSI-RS: {mode-0: A2}, {mode-1: B2};

the beam parameters associated with PUCCH resources are configured as:

PUCCH: {mode-0: A1}, {mode-1: C0};

the beam parameters associated with PUSCH resources are configured as:

PUSCH: {mode-0: A1}, {mode-1: C1};

the beam parameters associated with SRS resources are configured as:

SRS: {mode-0: A2}, {mode-1: C2}.

Based on the above-mentioned configuration, the working mode for the mode-0 may be determined, the same beam (indexed as A1) is used for CORESET2, PDSCH, PUCCH and PUSCH; the same beam (indexed as A0) is used for CORESET0 and CORESET1; CSI-RS and SRS do not work in a mode of the mode-0, their beams are configured by other methods, such as reuse independent configuration method of Rel-15 or 16. For the mode-1, in the downlink channel, the same downlink beam (indexed as B1) is used for CORESET2 and PDSCH; the same downlink beam (indexed as B0) is used for CORESET0 and CORESET1; CSI-RS does not work in a mode of mode-1. In the uplink channel, the beam indexed as C0 is used for PUCCH, the uplink beam indexed as C1 is used for PUSCH, and the uplink beam indexed as C2 is used for SRS.

The base station configures a TCI state pool including S=128 TCI-States for the terminal. Each state therein is indicated by the corresponding TCI-State Id. For example, the first TCI state therein is indicated by TCI-State0, the second TCI state is indicated by TCI-State1, and so on.

This solution may activate, through MAC-CE, TCI states from the TCI state pool configured by RRC. Mode indication may be included in this MAC-CE. For example, the MAC-CE indicates the mode-1, which is an independent uplink and downlink beam mode. At the same time, this MAC-CE activates Q−1+N TCI state groups, that is, activates 5 TCI state groups, and each state group includes 4 TCI states. A state group 1 corresponds to the beam indexed as n0, a state group 2 corresponds to the beam indexed as B1, a state group 3 corresponds to the beam indexed as C0, a state group 4 corresponds to the beam indexed as C1, and a state group 5 corresponds to the beam indexed as C2. For example, being activated via MAC-CE:

State group 1: TCI_State2, TCI_State5, TCI_State7, TCI_State9;

State group 2: TCI_State12, TCI_State15, TCI_State17, TCI_State19;

State group 3: TCI_State22, TCI_State25, TCI_State27, TCI_State29;

State group 4: TCI_State100, TCI_State112, TCI_State120, TCI_State126;

State group 5: TCI_State90, TCI_State102, TCI_State110, TCI_State116;

DCI is further used to select a beam from the above-mentioned state group activated by the MAC-CE, for indication. One method is to use two levels of DCI, where the first level of DCI includes Q−1+N=5 index fields, which respectively correspond to the indexes B0, B1, C0, C1 and C2, where bit 0 indicates that the beam is not indicated, and bit 1 indicates that the beam is indicated. For example:

| Index field (B0) | Index field (B1) | Index field (C0) | Index field (C1) | Index field (C2) |
| --- | --- | --- | --- | --- |
| 0 | 1 | 0 | 1 | 0 |

It represents that the second level of DCI only indicates the beams of B1 and C1, at this time, the second level of DCI includes two TCI fields, which indicate the beams of B1 and C1. For example:

| TCI field | TCI field |
| --- | --- |
| 00 | 11 |

It represents that the beam corresponding to TCI_State12 is used for the channel of (associated with) B1 for transmission, and the beam corresponding to TCI_State126 is used for the channel of (associated with) C1 for transmission.

Another indication method is to use one level of DCI, which always includes Q−1+N=5 TCI fields. The first field corresponds to the beam of B0, the second field corresponds to the beam of B1, and in turn correspond to the beams of C0, C1, and C2. For example:

| TCI field | TCI field | TCI field | TCI field | TCI field |
| --- | --- | --- | --- | --- |
| 01 | 10 | 11 | 10 | 11 |

Still another indication method is to use one level of DCI, which includes one index field (corresponding to the above-mentioned beam index field) and one TCI field, the index field indicates at least one of the indexes B0, B1, C0, C1 and C2. For example:

| Index field | TCI field |
| --- | --- |
| 001 | 10 |

It represents that the beam corresponding to TCI_State17 is used for the channel of the index B1 for transmission.

The difference between Example 3 and Example 2 is that: in Example 2, the quantities of uplink and downlink beam indexes are the same, and both have one invalid index B2; in Example 3, the downlink beam index is less than the uplink beam index by one; in Example 2, the uplink and downlink beam groups are indicated together; in Example 3, the uplink and downlink beams are indicated separately.

Example 4 the beam-related parameters of the channel and the reference signal are the same as those in Example 3 and will not be described again here.

The base station configures a TCI state pool including S=128 TCI-States for the terminal. Each state therein is indicated by the corresponding TCI-State Id. For example, the first TCI state therein is indicated by TCI-State0, the second TCI state is indicated by TCI-State1, and so on.

This solution may activate, through MAC-CE, TCI states from the TCI state pool configured by RRC. Mode indication may be included in this MAC-CE. For example, the MAC-CE indicates the mode-1, which is an independent uplink and downlink beam mode. At the same time, this MAC-CE activates one TCI state group, the state group includes 4 TCI state combinations. Each TCI state combination corresponds to beams indexed B0, B1, C0, C1 and C2. For example, activating via MAC-CE:

State groups: {TCI_State2, TCI_State5, TCI_State7, TCI_State9, TCI_State13};

{TCI_State12, TCI_State15, TCI_State17, TCI_State19, TCI_State23};

{TCI_State22, TCI_State25, TCI_State27, TCI_State29, TCI_State33};

{TCI_State100, TCI_State112, TCI_State120, TCI_State126, TCI_State83}.

DCI is further used to select a beam from the above-mentioned state group activated by MAC-CE, for indication. The DCI indication signaling includes one TCI field, and a value of the field is used to simultaneously indicate these five numbered beams.

It should be noted that in this embodiment of the present disclosure: in the independent uplink and downlink beam mode, the uplink and downlink beams (that is, TCI state) may be indicated separately or together, which is not limited here.

As can be seen from the above, the present solution involves a beam indication method that associates a beam index with each channel and/or each reference signal; MAC-CE or DCI may be used to indicate the corresponding beam for channels and/or reference signals with different beam indexes. This solution saves beam indication signaling overhead and reduces system complexity while ensuring certain beam flexibility.

The embodiment of the present disclosure also provides a terminal, as shown in FIG. 4, which includes a memory 41, a transceiver 42, and a processor 43, where the memory 41 is configured to store a computer program, the transceiver 42 is configured to send and/or receive data under a control of the processor 43; and the processor 43 is configured to read the computer program in the memory 41 and perform the following operations of:

receiving, through the transceiver 42, a beam indication signaling sent by a network device;

sending and/or receiving, through the transceiver 42, a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal.

The terminal provided by the embodiment in the present disclosure includes: receiving a beam indication signaling sent by a network device; sending and/or receiving a channel and/or a reference signal corresponding to a target beam according to the beam indication signaling and beam configuration information, where the beam indication signaling includes: at least one activated transmission configuration indicator (TCI) state group; and the beam configuration information includes: at least one associated beam parameter corresponding to at least one channel and/or at least one reference signal, which can realize that one associated beam parameter indicates the target beam, that is, corresponding target beam is indicated to the channel and/or the reference signal corresponding to the associated beam parameter, instead of having to perform independent beam indication for each channel; thereby saving the beam indication signaling overhead and reducing the system complexity while ensuring the certain beam flexibility, and well solving the problem in related art that the information processing solution related to beam indication increases system complexity and the signaling indication overhead.

Specifically, the transceiver 42 is configured to receive and send data under the control of the processor 43.

In FIG. 4, the bus architecture may include any quantity of interconnected buses and bridges, specifically various circuits such as one or more processors represented by the processor 43 and a memory represented by the memory 41 are linked together. The bus architecture may also link together various other circuits such as peripherals, voltage regulators, and power management circuits, which are all well known in the art and therefore will not be described further herein. The bus interface provides the interface. The transceiver 42 may be a plurality of elements, including a transmitter and a receiver, which provide a unit for communicating with various other apparatuses over transmission media, these transmission media include wireless channels, wired channels, optical cables and other transmission media. For different user devices, the user interface 44 may also be an interface capable of connecting externally and internally to the required device, the connected device includes but are not limited to a keypad, a monitor, a speaker, a microphone, and a joystick, etc.

The processor 43 is responsible for managing the bus architecture and general processing, and the memory 41 may store data used by the processor 43 when performing operations.

Optionally, the processor 43 may be a central processing unit (Central Processing Unit, CPU), an application specific integrated circuit (Application Specific Integrated Circuit, ASIC), a field programmable gate array (Field-Programmable Gate Array, FPGA) or a complex programmable logic device (Complex Programmable Logic Device, CPLD), the processor may also adopt a multi-core architecture.

The processor is configured to execute any of the methods provided by the embodiments of the present disclosure according to the obtained executable instructions by calling the computer program stored in the memory. The processor and the memory may also be physically arranged separately.

In the embodiments of the present disclosure, the sending and/or receiving the channel and/or the reference signal corresponding to the target beam according to the beam indication signaling and the beam configuration information includes: determining the target beam according to the TCI state group in the beam indication signaling; determining the channel and/or the reference signal corresponding to the target beam according to the beam indication signaling and the beam configuration information; and using the target beam to send and/or receive the corresponding channel and/or the corresponding reference signal.

The determining the channel and/or the reference signal corresponding to the target beam according to the beam indication signaling and the beam configuration information includes: determining a target beam identifier associated with the target beam according to the beam indication signaling; and determining the channel and/or the reference signal corresponding to the target beam according to the target beam identifier and the beam configuration information.

In the embodiments of the present disclosure, the associated beam parameter corresponds to a working mode, and the associated beam parameter indicates the beam identifier corresponding to the channel and/or the reference signal corresponding to the associated beam parameter in the working mode, where the working mode includes: at least one of a joint uplink and downlink beam mode and an independent uplink and downlink beam mode.

In the embodiments of the present disclosure, the beam identifier includes a first beam identifier indicating that a first working mode is invalid; and other beam modes other than the first working mode are used for the channel and/or the reference signal corresponding to the first beam identifier.

A quantity of beam identifiers is predefined or indicated by the network device.

In the embodiments of the present disclosure, the TCI state group corresponds to at least one beam identifier; and/or, the TCI state group includes at least one TCI state or TCI state combination.

Further, the operation further includes: updating the at least one beam identifier according to an update indication sent by the network device.

In the embodiments of the present disclosure, in a case that the beam indication signaling includes at least two activated TCI state groups, the beam indication signaling further includes: downlink control information (DCI) configured to indicate at least one target beam identifier and a corresponding target TCI state group, where the DCI includes two levels of DCI or one level of DCI.

In a case that the DCI includes two levels of DCI, the DCI includes a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI includes one level of DCI, the DCI includes at least two TCI fields, each of TCI fields indicates a target TCI state group corresponding to a beam identifier; the corresponding beam identifier includes the target beam identifier; and/or, in a case that the DCI includes one level of DCI, the DCI includes a beam identifier field and the TCI field, the beam identifier field is configured to indicate the target beam identifier, and the TCI field is configured to indicate the target TCI state group corresponding to the target beam identifier.

Further, the operation further includes: receiving, through the transceiver, the beam configuration information sent by the network device, prior to the sending and/or receiving a channel and/or a reference signal corresponding to a target beam according to the beam indication signaling and the beam configuration information.

It should be noted here that the above-mentioned terminal provided by the embodiment of the present disclosure can implement all the method steps implemented by the above-mentioned terminal-side embodiment of the information processing method, and can achieve the same technical effect, the parts and beneficial effects in this embodiment that are the same as those in the method embodiment will not be described in detail here.

Figure 5:
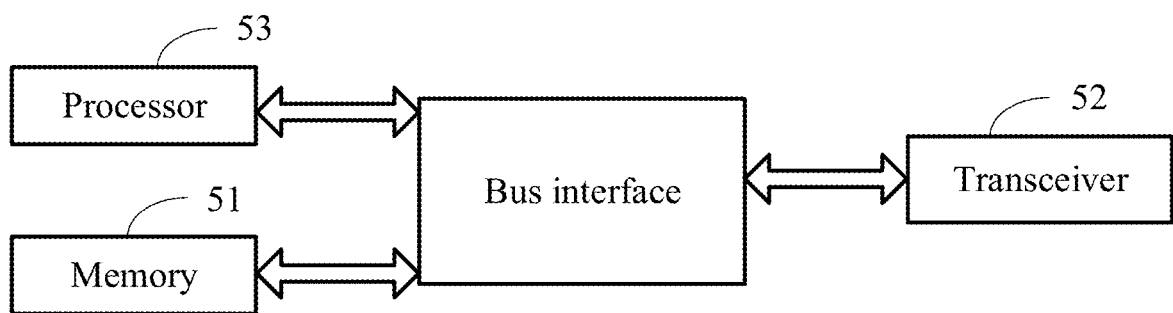
FIG. 5 is a schematic structural view of a network device according to some embodiments of the present disclosure.

The embodiment of the present disclosure also provides a network device, as shown in FIG. 5, which includes a memory 51, a transceiver 52, and a processor 53, where the memory 51 is configured to store a computer program; the transceiver 52 is configured to send and/or receive data under a control of the processor 53; and the processor 53 is configured to read the computer program in the memory 51 and perform the following operations of:

determining a beam indication signaling and sending, through the transceiver 52, the beam indication signaling to a terminal;

sending and/or receiving, through the transceiver 52, a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal.

The network device provided by the embodiment in the present disclosure includes: determining a beam indication signaling and sending the beam indication signaling to a terminal; sending and/or receiving a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal, which can realize that one associated beam parameter indicates the target beam, that is, the corresponding target beam is indicated to the channel and/or the reference signal corresponding to the associated beam parameter, instead of having to perform independent beam indication for each channel; thereby saving the beam indication signaling overhead and reducing the system complexity while ensuring the certain beam flexibility, and well solving the problem in related art that the information processing solution related to beam indication increases the system complexity and the signaling indication overhead.

Specifically, the transceiver 52 is configured to receive and send data under the control of the processor 53.

In FIG. 5, the bus architecture may include any quantity of interconnected buses and bridges, specifically various circuits such as one or more processors represented by the processor 53 and the memory represented by the memory 51 are linked together. The bus architecture may also link together various other circuits such as peripherals, voltage regulators, and power management circuits, which are all well known in the art and therefore will not be described further herein. The bus interface provides the interface. The transceiver 52 may be a plurality of elements, including a transmitter and a receiver, which provide a unit for communicating with various other apparatuses over transmission media, these transmission media include wireless channels, wired channels, optical cables, and other transmission media. The processor 53 is responsible for managing the bus architecture and general processing, and the memory 51 may store data used by the processor 53 when performing operations.

The processor 53 may be a central processing unit (Central Processing Unit, CPU), an application specific integrated circuit (Application Specific Integrated Circuit, ASIC), a field programmable gate array (Field-Programmable Gate Array, FPGA) or a complex programmable logic device (Complex Programmable Logic Device, CPLD), the processor can also adopt a multi-core architecture.

In the embodiments of the present disclosure, the sending and/or receiving the channel and/or the reference signal corresponding to the target beam according to the beam indication signaling and the beam configuration information includes: determining the target beam according to the TCI state group in the beam indication signaling; determining the channel and/or the reference signal corresponding to the target beam according to the beam indication signaling and the beam configuration information; and using the target beam to send and/or receive the corresponding channel and/or the corresponding reference signal.

The determining the channel and/or the reference signal corresponding to the target beam according to the beam indication signaling and the beam configuration information includes: determining a target beam identifier associated with the target beam according to the beam indication signaling; and determining the channel and/or the reference signal corresponding to the target beam according to the target beam identifier and the beam configuration information.

In the embodiments of the present disclosure, the associated beam parameter corresponds to a working mode, and the associated beam parameter indicates the beam identifier corresponding to the channel and/or the reference signal corresponding to the associated beam parameter in the working mode.

The working mode includes: at least one of a joint uplink and downlink beam mode and an independent uplink and downlink beam mode.

In the embodiments of the present disclosure, the beam identifier includes a first beam identifier indicating that a first working mode is invalid; and other beam modes other than the first working mode are used for the channel and/or the reference signal corresponding to the first beam identifier.

A quantity of beam identifiers is predefined or indicated by the network device.

In the embodiments of the present disclosure, the TCI state group corresponds to at least one beam identifier; and/or, the TCI state group includes at least one TCI state or TCI state combination.

Further, the operation also includes: determining an update indication and sending, through the transceiver, the update indication to the terminal; and updating the at least one beam identifier according to the update indication.

In the embodiments of the present disclosure, in a case that the beam indication signaling includes at least two activated TCI state groups, the beam indication signaling further includes: indicating downlink control information (DCI) configured to indicate at least one target beam identifier and a corresponding target TCI state group, where the DCI includes two levels of DCI or one level of DCI.

In a case that the DCI includes two levels of DCI, the DCI includes a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI includes one level of DCI, the DCI includes at least two TCI fields, each of TCI fields indicates a target TCI state group corresponding to a corresponding beam identifier; the corresponding beam identifier includes the target beam identifier; and/or, in a case that the DCI includes one level of DCI, the DCI includes a beam identifier field and the TCI field, the beam identifier field is configured to indicate the target beam identifier, and the TCI field is configured to indicate the target TCI state group corresponding to the target beam identifier.

Further, the operation further includes: determining the beam configuration information, and sending, through the transceiver, the beam configuration information to the terminal, prior to the sending and/or receiving a channel and/or a reference signal corresponding to a target beam according to the beam indication signaling and the beam configuration information.

It should be noted here that the above-mentioned network device provided by the embodiment of the present disclosure can implement all the method steps implemented by the above-mentioned network device-side embodiment of the information processing method, and can achieve the same technical effect, the parts and beneficial effects in this embodiment that are the same as those in the method embodiment will not be described in detail here.

Figure 6:
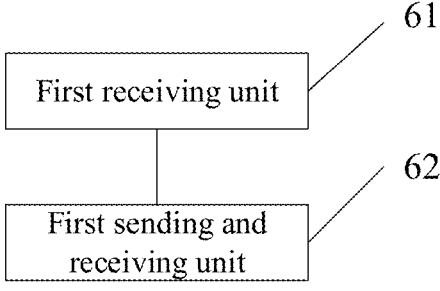
FIG. 6 is a first schematic structural view of an information processing apparatus according to some embodiments of the present disclosure.

An embodiment of the present disclosure also provides an information processing apparatus, performed by a terminal, as shown in FIG. 6. The terminal includes:

a first receiving unit 61, configured to receive a beam indication signaling sent by a network device;

a first sending and receiving unit 62, configured to send and/or receive a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal.

The information processing apparatus provided by the embodiment in the present disclosure receives a beam indication signaling sent by a network device; sends and/or receives a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal, which can realize that one associated beam parameter indicates the target beam, that is, the corresponding target beam is indicated to the channel and/or the reference signal corresponding to the associated beam parameter, instead of having to perform independent beam indication for each channel; thereby saving beam indication signaling overhead and reducing system complexity while ensuring a certain beam flexibility, and well solving the problem in related art that the information processing solution related to beam indication increases system complexity and signaling indication overhead.

In the embodiments of the present disclosure, the sending and/or receiving the channel and/or the reference signal corresponding to the target beam according to the beam indication signaling and the beam configuration information includes: determining the target beam according to the TCI state group in the beam indication signaling; determining the channel and/or the reference signal corresponding to the target beam according to the beam indication signaling and the beam configuration information; and using the target beam to send and/or receive the corresponding channel and/or the corresponding reference signal.

The determining the channel and/or the reference signal corresponding to the target beam according to the beam indication signaling and the beam configuration information includes: determining a target beam identifier associated with the target beam according to the beam indication signaling; and determining the channel and/or the reference signal corresponding to the target beam according to the target beam identifier and the beam configuration information.

In the embodiments of the present disclosure, the associated beam parameter corresponds to a working mode, and the associated beam parameter indicates the beam identifier corresponding to the channel and/or the reference signal corresponding to the associated beam parameter in the working mode.

The working mode includes: at least one of a joint uplink and downlink beam mode and an independent uplink and downlink beam mode.

In the embodiments of the present disclosure, the beam identifier includes a first beam identifier indicating that a first working mode is invalid; and other beam modes other than the first working mode are used for the channel and/or the reference signal corresponding to the first beam identifier.

A quantity of beam identifiers is predefined or indicated by the network device.

In the embodiments of the present disclosure, the TCI state group corresponds to at least one beam identifier; and/or, the TCI state group includes at least one TCI state or TCI state combination.

Further, the information processing apparatus further includes: a first updating unit, configured to update the at least one beam identifier according to an update indication sent by the network device.

In the embodiments of the present disclosure, in a case that the beam indication signaling includes at least two activated TCI state groups, the beam indication signaling further includes: downlink control information (DCI) configured to indicate at least one target beam identifier and a corresponding target TCI state group, where the DCI includes two levels of DCI or one level of DCI.

In a case that the DCI includes two levels of DCI, the DCI includes a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI includes one level of DCI, the DCI includes at least two TCI fields, each of TCI fields indicates a target TCI state group corresponding to a beam identifier; the corresponding beam identifier includes the target beam identifier; and/or, in a case that the DCI includes one level of DCI, the DCI includes a beam identifier field and the TCI field, the beam identifier field is configured to indicate the target beam identifier, and the TCI field is configured to indicate the target TCI state group corresponding to the target beam identifier.

Further, the information processing apparatus further includes: a second receiving unit, configured to receive the beam configuration information sent by the network device, prior to the sending and/or receiving a channel and/or a reference signal corresponding to a target beam according to the beam indication signaling and the beam configuration information.

It should be noted here that the above-mentioned information processing apparatus provided by the embodiment of the present disclosure can implement all the method steps implemented by the above-mentioned terminal-side information processing method embodiment, and can achieve the same technical effect, the parts and beneficial effects in this embodiment that are the same as those in the method embodiment will not be described in detail here.

Figure 7:
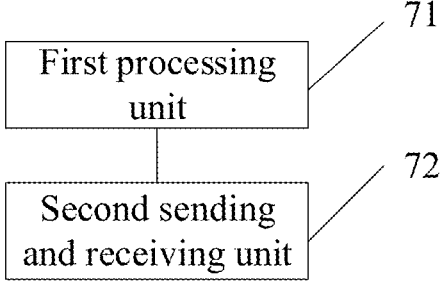
FIG. 7 is a second schematic structural view of the information processing apparatus according to some embodiments of the present disclosure.

An embodiment of the present disclosure also provides an information processing apparatus, performed by a network device, as shown in FIG. 7, which includes:

a first processing unit 71, configured to determine a beam indication signaling and send the beam indication signaling to a terminal;

a second sending and receiving unit 72, configured to send and/or receive a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal.

The information processing apparatus provided by the embodiment in the present disclosure determines a beam indication signaling and sends the beam indication signaling to a terminal; sends and/or receives a channel and/or a reference signal corresponding to a target beam according to the beam indication signaling and the beam configuration information, where the beam indication signaling includes: at least one activated transmission configuration indicator (TCI) state group; and the beam configuration information includes: at least one associated beam parameter corresponding to at least one channel and/or at least one reference signal, which can realize that one associated beam parameter indicates the target beam, that is, the corresponding target beam is indicated to the channel and/or the reference signal corresponding to the associated beam parameter, instead of having to perform independent beam indication for each channel; thereby saving beam indication signaling overhead and reducing system complexity while ensuring a certain beam flexibility, and well solving the problem in related art that the information processing solution related to beam indication increases system complexity and signaling indication overhead.

In the embodiments of the present disclosure, the sending and/or receiving the channel and/or the reference signal corresponding to the target beam according to the beam indication signaling and the beam configuration information includes: determining the target beam according to the TCI state group in the beam indication signaling; determining the channel and/or the reference signal corresponding to the target beam according to the beam indication signaling and the beam configuration information; and using the target beam to send and/or receive the corresponding channel and/or the corresponding reference signal.

The determining the channel and/or the reference signal corresponding to the target beam according to the beam indication signaling and the beam configuration information includes: determining a target beam identifier associated with the target beam according to the beam indication signaling; and determining the channel and/or the reference signal corresponding to the target beam according to the target beam identifier and the beam configuration information.

In the embodiments of the present disclosure, the associated beam parameter corresponds to a working mode, and the associated beam parameter indicates the beam identifier corresponding to the channel and/or the reference signal corresponding to the associated beam parameter in the working mode.

The working mode includes: at least one of a joint uplink and downlink beam mode and an independent uplink and downlink beam mode.

In the embodiments of the present disclosure, the beam identifier includes a first beam identifier indicating that a first working mode is invalid; and other beam modes other than the first working mode are used for the channel and/or the reference signal corresponding to the first beam identifier.

A quantity of beam identifiers is predefined or indicated by the network device.

In the embodiments of the present disclosure, the TCI state group corresponds to at least one beam identifier; and/or, the TCI state group includes at least one TCI state or TCI state combination.

Further, the information processing apparatus further includes: a second processing unit, configured to determine an update indication and send the update indication to the terminal; and a second updating unit, configured to update the at least one beam identifier according to the update indication.

In the embodiments of the present disclosure, in a case that the beam indication signaling includes at least two activated TCI state groups, the beam indication signaling further includes: downlink control information (DCI) configured to indicate at least one target beam identifier and a corresponding target TCI state group, where the DCI includes two levels of DCI or one level of DCI.

In a case that the DCI includes two levels of DCI, the DCI includes a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI includes one level of DCI, the DCI includes at least two TCI fields, each of TCI fields indicates a target TCI state group corresponding to a beam identifier; the corresponding beam identifier includes the target beam identifier; and/or, in a case that the DCI includes one level of DCI, the DCI includes a beam identifier field and the TCI field, the beam identifier field is configured to indicate the target beam identifier, and the TCI field is configured to indicate the target TCI state group corresponding to the target beam identifier.

Further, the information processing apparatus further includes: a third processing unit, configured to determine the beam configuration information and send the beam configuration information to the terminal, prior to the sending and/or receiving a channel and/or a reference signal corresponding to a target beam according to the beam indication signaling and the beam configuration information.

It should be noted here that the above-mentioned information processing apparatus provided by the embodiment of the present disclosure can implement all the method steps implemented by the above-mentioned network device-side information processing method embodiment, and can achieve the same technical effect, the parts and beneficial effects in this embodiment that are the same as those in the method embodiment will not be described in detail here.

It should be noted that the division of units in the embodiments of the present disclosure is schematic and is only a logical function division. In actual implementation, there may be other division methods. In addition, each functional unit in various embodiments of the present disclosure may be integrated into one processing unit, or each unit may exist physically alone, or two or more units may be integrated into one unit. The above-mentioned integrated units may be implemented in the form of hardware or software functional units.

If the integrated unit is implemented in the form of a software functional unit and sold or used as an independent product, the integrated unit may be stored in a processor-readable storage medium. Based on this understanding, the essential part, or the part contributing to the related art, or all or part, of the technical solutions of the present disclosure may be embodied in the form of a software product, the computer software product is stored in a storage medium and includes several instructions to cause a computer device (which may be a personal computer, a server, or a network device, etc.) or a processor to execute the all or part of the steps of the methods described in various embodiments of the present disclosure. The aforementioned storage media include: U disk, mobile hard disk, Read-Only Memory (ROM), Random Access Memory (RAM), magnetic disk or optical disk and other media that can store program codes.

Embodiments of the present disclosure also provide a processor-readable storage medium, the processor-readable storage medium is stored with a computer program, the computer program is used to cause the processor to execute the above-mentioned information processing method on the terminal side; or, the processor-readable storage medium is stored with a computer program, the computer program is used to cause the processor to execute the above-mentioned information processing method on the network device side.

The processor-readable storage medium may be any available media or data storage device that the processor can access, including but not limited to a magnetic storage (such as floppy disks, hard disks, tapes, magneto-optical disks (MO), etc.), an optical storage (such as CD, DVD, BD, HVD, etc.), and a semiconductor memory (such as ROM, EPROM, EEPROM, non-volatile memory (NAND FLASH), solid state drive (SSD)), etc.

The implementations of the embodiments of the information processing method on the above-mentioned terminal side or the network device side are applicable to the embodiments of the processor-readable storage medium, and can also achieve the same technical effect.

Those skilled in the art will appreciate that embodiments of the present disclosure may be provided as methods, systems, or computer program products. Accordingly, the present disclosure may take the form of an entire hardware embodiment, an entire software embodiment, or an embodiment that combines software and hardware aspects. Furthermore, the present disclosure may take the form of a computer program product embodied on one or more computer-usable storage media (including, but not limited to, magnetic disk storage, optical storage, and the like) having computer-usable program codes embodied therein.

The present disclosure is described with reference to flowcharts and/or block diagrams of methods, devices (systems), and computer program products according to the embodiments of the present disclosure. It will be understood that each process and/or block in the flowcharts and/or block diagrams, and combinations of processes and/or blocks in the flowcharts and/or block diagrams, can be implemented by computer-executable instructions. These computer-executable instructions may be provided to a processor of a general-purpose computer, special-purpose computer, embedded processor, or other programmable data processing device to produce a machine such that the instructions executed by the processor of the computer or other programmable data processing device produce an apparatus for implementing the functions specified in a process or processes in a flowchart and/or in a block or blocks in a block diagram.

These processor-executable instructions may also be stored in a processor-readable memory that causes a computer or other programmable data processing device to operate in a particular manner, such that instructions stored in the processor-readable memory produce an article of manufacture including instruction apparatus, the instruction apparatus implements the functions specified in a process or processes in the flowchart and/or in a block or blocks in the block diagram.

These processor-executable instructions may also be loaded onto a computer or other programmable data processing device, causing a series of operational steps executed on the computer or other programmable device to produce computer-implemented processing, so that the instructions executed on a computer or other programmable device provide steps for implementing the functions specified in a process or processes in the flowchart and/or in a block or blocks in the block diagram.

It should be noted that it should be understood that the division of each module above is only a division of logical functions. In actual implementation, the modules can be fully or partially integrated into a physical entity, or can also be physically separated, and these modules may all be implemented through invoking software by processing elements; or may all be implemented in the form of hardware; some modules may also be implemented through invoking software by processing elements, and some modules may be implemented in the form of hardware. For example, a certain module may be a separate processing element, or may be integrated and implemented in a chip of the above-mentioned apparatus. In addition, the module may also be stored in the memory of the above-mentioned apparatus in the form of program codes, the function of the above-mentioned determining module is called and executed by a certain processing element of the above-mentioned apparatus. The implementation of other modules is similar. In addition, all or part of these modules can be integrated together or implemented independently. The processing element described here may be an integrated circuit with signal processing capabilities. During the implementation process, each step of the above-mentioned method or each of the above modules can be completed in the form of hardware integrated logic circuits in the processor element or by instructions in the form of software.

For example, each module, unit, sub-unit or sub-module may be one or more integrated circuits configured to implement the above method, such as: one or more application specific integrated circuits (Application Specific Integrated Circuit, ASICs), or one or more microprocessors (digital signal processors, DSPs), or one or more field programmable gate arrays (Field Programmable Gate Array, FPGA), etc. For another example, when one of the above modules is implemented in the form of a processing element executing program codes, the processing element may be a general-purpose processor, such as a central processing unit (Central Processing Unit, CPU) or other processors that may call the program codes. For another example, these modules may be integrated together and implemented in the form of a system-on-a-chip (SOC).

The terms "first", "second", etc. in the specification and claims of the present disclosure are used to distinguish similar objects and are not necessarily used to describe a specific order or sequence. It should be understood that the terms so used are interchangeable under appropriate circumstances so that the embodiments of the present disclosure described herein may be implemented, for example, in sequences other than those illustrated or described herein. In addition, the terms "including" and "having" and any variations thereof are intended to cover non-exclusive inclusions, e.g., a process, method, system, product, or device including a series of steps or units needs not be limited to those steps or units expressly listed, but may include other steps or units not expressly listed or inherent to the process, method, product or device. In addition, the use of "and/or" in the specification and claims indicates at least one of the connected objects, for example, A and/or B and/or C indicates 7 situations that A exists alone, B exists alone, C exists alone, and both A and B exist, both B and C exist, both A and C exist, and A, B and C all exist. Similarly, the use of "at least one of A and B" in this specification and the claims should be understood to "A exists alone, B exists alone, or both A and B exist."

Obviously, those skilled in the art may make various modifications and variations to the present disclosure without departing from the spirit and scope of the present disclosure. Therefore, if these modifications and variations of the present disclosure fall within the scope of the claims of the present disclosure and equivalent technologies, the present disclosure is also intended to include these modifications and variations.

What is claimed is:

1. An information processing method performed by a terminal, comprising:

receiving a beam indication signaling sent by a network device;

sending and/or receiving a channel and/or a reference signal corresponding to a target beam according to the beam indication signaling and beam configuration information, wherein the beam indication signaling comprises at least one activated Transmission Configuration Indicator (TCI) state group; and the beam configuration information comprises: at least one associated beam parameter corresponding to at least one channel and/or at least one reference signal, wherein the at least one associated beam parameter corresponds to a working mode, and the at least one associated beam parameter indicates one or more beam identifiers corresponding to the at least one channel and/or the at least one reference signal corresponding to the at least one associated beam parameter in the working mode.

2. The information processing method according to claim 1, wherein the sending and/or receiving the channel and/or the reference signal corresponding to the target beam according to the beam indication signaling and the beam configuration information comprises:

determining the target beam according to the TCI state group in the beam indication signaling;

determining the channel and/or the reference signal corresponding to the target beam according to the beam indication signaling and the beam configuration information; and sending and/or receiving the channel and/or the reference signal corresponding to the target beam by using the target beam.

3. The information processing method according to claim 2, wherein the determining the channel and/or the reference signal corresponding to the target beam according to the beam indication signaling and the beam configuration information comprises:

determining a target beam identifier associated with the target beam according to the beam indication signaling; and determining the channel and/or the reference signal corresponding to the target beam according to the target beam identifier and the beam configuration information.

4. The information processing method according to claim 1, wherein the working mode comprises: at least one of a joint uplink and downlink beam mode and an independent uplink and downlink beam mode;

and/or a quantity of the beam identifiers is predefined or indicated by the network device.

5. The information processing method according to claim 1, wherein the TCI state group corresponds to at least one beam identifier; and/or, the TCI state group comprises at least one TCI state or TCI state combination.

6. The information processing method according to claim 5, further comprising:

updating the at least one beam identifier according to an update indication sent by the network device.

7. The information processing method according to claim 1, wherein in a case that the beam indication signaling comprises at least two activated TCI state groups, the beam indication signaling further comprises:

Downlink Control Information (DCI) configured to indicate at least one target beam identifier and a corresponding target TCI state group, wherein the DCI comprises two levels of DCI or one level of DCI.

8. The information processing method according to claim 7, wherein in a case that the DCI comprises two levels of DCI, the two levels of DCI comprise a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI comprises one level of DCI, the one level of DCI comprises at least two TCI fields, each of the at least two TCI fields indicates a target TCI state group corresponding to a corresponding beam identifier; the corresponding beam identifier comprises the target beam identifier; and/or, in a case that the DCI comprises one level of DCI, the one level of DCI comprises a beam identifier field and a TCI field, the beam identifier field is configured to indicate the target beam identifier, and the TCI field is configured to indicate the target TCI state group corresponding to the target beam identifier.

9. The information processing method according to claim 1, wherein the beam identifier comprises a first beam identifier indicating that a first working mode is invalid; and a working mode other than the first working mode is used for the channel and/or the reference signal corresponding to the first beam identifier.

10. An information processing method performed by a network device, comprising:

determining a beam indication signaling and sending the beam indication signaling to a terminal;

sending and/or receiving a channel and/or a reference signal corresponding to a target beam according to the beam indication signaling and beam configuration information, wherein the beam indication signaling comprises: at least one activated Transmission Configuration Indicator (TCI) state group; and the beam configuration information comprises: at least one associated beam parameter corresponding to at least one channel and/or at least one reference signal, wherein the at least one associated beam parameter corresponds to a working mode, and the at least one associated beam parameter indicates one or more beam identifiers corresponding to the at least one channel and/or the at least one reference signal corresponding to the at least one associated beam parameter in the working mode.

11. The information processing method according to claim 10, wherein the sending and/or receiving the channel and/or the reference signal corresponding to the target beam according to the beam indication signaling and the beam configuration information comprises:

determining the target beam according to the at least one TCI state group in the beam indication signaling;

determining the channel and/or the reference signal corresponding to the target beam according to the beam indication signaling and the beam configuration information; and sending and/or receiving the channel and/or the reference signal corresponding to the target beam by using the target beam.

12. The information processing method according to claim 11, wherein the determining the channel and/or the reference signal corresponding to the target beam according to the beam indication signaling and the beam configuration information comprises:

determining a target beam identifier associated with the target beam according to the beam indication signaling; and determining the channel and/or the reference signal corresponding to the target beam according to the target beam identifier and the beam configuration information.

13. The information processing method according to claim 10, wherein the working mode comprises: at least one of a joint uplink and downlink beam mode and an independent uplink and downlink beam mode;

and/or a quantity of the beam identifiers is predefined or indicated by the network device.

14. The information processing method according to claim 10, wherein the TCI state group corresponds to at least one beam identifier; and/or, the TCI state group comprises at least one TCI state or TCI state combination.

15. The information processing method according to claim 14, further comprising:

determining an update indication and sending the update indication to the terminal; and updating the at least one beam identifier according to the update indication.

16. The information processing method according to claim 10, wherein in a case that the beam indication signaling comprises at least two activated TCI state groups, the beam indication signaling further comprises:

Downlink Control Information (DCI) configured to indicate at least one target beam identifier and a corresponding target TCI state group, wherein the DCI comprises two levels of DCI or one level of DCI.

17. The information processing method according to claim 16, wherein in a case that the DCI comprises two levels of DCI, the two levels of DCI comprise a first level of DCI and a second level of DCI, and the first level of DCI is configured to indicate at least one target beam identifier, and the second level of DCI is configured to indicate a target TCI state group corresponding to the at least one target beam identifier; and/or, in a case that the DCI comprises one level of DCI, the one level of DCI comprises at least two TCI fields, each of the at least two TCI fields indicates a target TCI state group corresponding to a corresponding beam identifier; the corresponding beam identifier comprises the target beam identifier; and/or, in a case that the DCI comprises one level of DCI, the one level of DCI comprises a beam identifier field and a TCI field, the beam identifier field is configured to indicate the target beam identifier, and the TCI field is configured to indicate the target TCI state group corresponding to the target beam identifier.

18. A network device, comprises:

a memory, a transceiver, and a processor, wherein the memory is configured to store a computer program; the transceiver is configured to send and/or receive data under a control of the processor; and the processor is configured to read the computer program in the memory and perform steps of the information processing method according to claim 10.

19. The information processing method according to claim 10, wherein the beam identifier comprises a first beam identifier indicating that a first working mode is invalid; and other working modes other than the first working mode is used for the channel and/or the reference signal corresponding to the first beam identifier.

20. A terminal, comprises:

a memory, a transceiver, and a processor, wherein, the memory is configured to store a computer program; the transceiver is configured to send and/or receive data under a control of the processor; the processor is configured to read the computer program in the memory and perform the following operations of:

receiving, through the transceiver, a beam indication signaling sent by a network device;

sending and/or receiving, through the transceiver, a channel and/or a reference signal corresponding to a target beam according to the beam indication signaling and beam configuration information, wherein the beam indication signaling comprises at least one activated Transmission Configuration Indicator (TCI) state group; and the beam configuration information comprises: at least one associated beam parameter corresponding to at least one channel and/or at least one reference signal, wherein the at least one associated beam parameter corresponds to a working mode, and the at least one associated beam parameter indicates one or more beam identifiers corresponding to the at least one channel and/or the at least one reference signal corresponding to the at least one associated beam parameter in the working mode.

* * * * *